(12) United States Patent
Wang

(10) Patent No.: US 12,381,394 B2
(45) Date of Patent: Aug. 5, 2025

(54) VOLTAGE COMPENSATION APPARATUS, INVERTER APPARATUS, AND PHOTOVOLTAIC POWER GENERATION SYSTEM

(71) Applicant: Huawei Digital Power Technologies Co., Ltd., Shenzhen (CN)

(72) Inventor: Xun Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 163 days.

(21) Appl. No.: 18/156,558

(22) Filed: Jan. 19, 2023

(65) Prior Publication Data
US 2023/0155382 A1   May 18, 2023

Related U.S. Application Data

(63) Continuation of application No. PCT/CN2021/087595, filed on Apr. 15, 2021.

(30) Foreign Application Priority Data

Jul. 24, 2020   (CN) .......................... 202010721883.0

(51) Int. Cl.
 *H02J 3/12*   (2006.01)
 *H02J 3/38*   (2006.01)

(52) U.S. Cl.
 CPC ............... *H02J 3/12* (2013.01); *H02J 3/381* (2013.01); *H02J 2300/24* (2020.01)

(58) Field of Classification Search
 CPC .......... H02J 3/12; H02J 3/381; H02J 2300/24; H02H 9/02; H02M 7/42; H02M 1/32; H02S 40/32; H02S 40/30; Y02E 10/56; Y02E 40/30

USPC .......................................................... 307/82
 See application file for complete search history.

(56) References Cited

U.S. PATENT DOCUMENTS

| | | | |
|---|---|---|---|
| 9,923,517 B1 * | 3/2018 | Wang | H02S 50/10 |
| 2020/0083715 A1 * | 3/2020 | Yoscovich | H02J 3/381 |

FOREIGN PATENT DOCUMENTS

| | | | |
|---|---|---|---|
| CN | 203166494 U | | 8/2013 |
| CN | 203218893 U | | 9/2013 |
| CN | 110071521 A | | 7/2019 |
| CN | 110932667 A | | 3/2020 |
| CN | 211481228 | * | 9/2020 |
| CN | 111969646 A | | 11/2020 |

* cited by examiner

Primary Examiner — Richard Tan
(74) Attorney, Agent, or Firm — Maier & Maier, PLLC

(57) ABSTRACT

A voltage compensation apparatus, an inverter apparatus, and a photovoltaic power generation system. The system includes a photovoltaic panel string and an inverter apparatus. The inverter apparatus includes an inverter and a voltage compensation apparatus. One pole of a power output terminal of the voltage compensation apparatus is coupled and connected to an N wire in a power grid. In this way, the power output terminal of the voltage compensation apparatus can be directly coupled and connected to the N wire in the power grid, to form a power compensation loop, and there is no need to form a power compensation loop based on a grounding wire of the inverter. Therefore, an electric shock risk that exists when a person unintentionally comes into contact with a housing of the inverter can be eliminated.

13 Claims, 15 Drawing Sheets

VOLTAGE COMPENSATION APPARATUS, INVERTER APPARATUS, AND PHOTOVOLTAIC POWER GENERATION SYSTEM

CROSS-REFERENCE TO RELATED APPLICATIONS

This application a continuation of International Application No. PCT/CN2021/087595, filed on Apr. 15, 2021, which claims priority to No. 202010721883.0, filed on Jul. 24, 2020. The disclosures of the aforementioned applications are hereby incorporated by reference in their entireties.

FIELD

The embodiments relate to the field of photovoltaic power generation, a voltage compensation apparatus, an inverter apparatus, and a photovoltaic power generation system.

BACKGROUND

A photovoltaic panel string is a main component in a photovoltaic (PV) power generation system. The photovoltaic panel string is prone to generate a potential induced degradation (PID) effect in a humid environment. The PID effect of the photovoltaic panel string is a phenomenon in which the photovoltaic panel string has a bias voltage to ground and power attenuation occurs under the action of the bias voltage. In the PID effect of the photovoltaic panel string, power of the photovoltaic panel string is severely attenuated, and consequently power output of an entire power station is affected. Therefore, it is very important to reduce impact of the PID effect of the photovoltaic panel string on the photovoltaic panel string.

Based on a reversible principle of a principle based on which the PID effect of the photovoltaic panel string is generated, the PID effect of the photovoltaic panel string may be repaired by using a compensation loop, and a voltage compensation apparatus may be built in an inverter in the photovoltaic power generation system. When the photovoltaic panel string is not illuminated, power is obtained from a power grid by using the voltage compensation apparatus, and a compensation voltage is output between the photovoltaic panel string and protective earthing (PE), to repair the PID effect of the photovoltaic panel string, so as to increase a power generation capacity of the photovoltaic power generation system. A power input terminal of the voltage compensation apparatus is coupled and connected to the power grid. One pole of a power output terminal of the voltage compensation apparatus is coupled and connected to the photovoltaic panel string, and the other pole of a power output terminal of a power conversion module is coupled and connected to an external housing of the inverter, and then is coupled and connected to the PE by using the external housing of the inverter. In this case, the PE, a path between the photovoltaic panel string and the PE, a path between the voltage compensation apparatus and the photovoltaic panel string, a path between the voltage compensation apparatus and the external housing of the inverter, and a path between the external housing of the inverter and the PE form a compensation loop, to compensate for voltage attenuation of the photovoltaic panel string caused due to the bias voltage between the photovoltaic panel string and the PE, so as to repair the PID effect of the photovoltaic panel string.

The PE and the external housing of the inverter are two components independent of each other. Therefore, a wire needs to be disposed between the PE and the external housing of the inverter, to electrically couple and connect the PE and the external housing of the inverter. The wire between the external housing of the inverter and the PE is usually manually disposed. Consequently, a problem such as a missed connection or relatively poor connection quality (poor contact) is prone to occur. Once the problem occurs, the compensation loop described above is broken, and an effect of repairing the PID effect of the photovoltaic panel string is lost.

SUMMARY

The embodiments may provide a voltage compensation apparatus, an inverter apparatus, and a photovoltaic power generation system, to resolve a problem that there is poor quality during repairing of a PID effect of an existing photovoltaic panel.

According to a first aspect, an embodiment may provide a voltage compensation apparatus, including a power conversion module. The power conversion module is coupled and connected to a power input terminal of the voltage compensation apparatus and a power output terminal of the voltage compensation apparatus. The power input terminal of the voltage compensation apparatus is coupled and connected to a power grid and is configured to obtain power from the power grid. One pole of the power output terminal of the voltage compensation apparatus is coupled and connected to a power output terminal of a photovoltaic panel string, a power input terminal of an inverter, a power input terminal of an inverter unit in the inverter, and/or a loop between the power input terminal of the inverter and the power input terminal of the inverter unit. The other pole of the power output terminal of the voltage compensation apparatus is coupled and connected to an N wire in the power grid, and is configured to apply the power obtained from the power grid between the power output terminal of the photovoltaic panel string and the ground.

In this way, when the photovoltaic panel string does not generate power, the voltage compensation apparatus may obtain power from the power grid, and then compensate for a bias voltage consumed by the photovoltaic panel string to ground, to repair a power attenuation phenomenon occurring in the photovoltaic panel string. In addition, the power output terminal of the voltage compensation apparatus is directly coupled and connected to an N wire in the power grid, to form a power compensation loop, and there is no need to form a power compensation loop based on a grounding wire of the inverter. Therefore, even if a connection of the grounding wire of the inverter is missed or there is relatively poor connection quality, voltage compensation can still be performed for the photovoltaic panel string, and an electric shock risk to a person can be avoided.

In an implementation, if the voltage compensation apparatus is disposed in the inverter, the power input terminal of the voltage compensation apparatus is coupled and connected to a loop between a grid-connected switch unit in the inverter and a power output terminal of the inverter.

In an implementation, if the voltage compensation apparatus is disposed outside the inverter, the power input terminal of the voltage compensation apparatus is coupled and connected to a power output terminal of the inverter or is coupled and connected to the power grid located outside the inverter.

In this way, an appropriate power-obtaining connection manner may be selected for the voltage compensation apparatus based on a position at which the voltage compensation apparatus is disposed.

In an implementation, power input terminals of the voltage compensation apparatus are respectively coupled and connected to at least one of phases A, B, and C in the power grid and the N wire in the power grid; or power input terminals of the voltage compensation apparatus are connected to at least two of phases A, B, and C in the power grid; or power input terminals of the voltage compensation apparatus are coupled and connected to an L phase in the power grid and the N wire in the power grid.

In this way, the voltage compensation apparatus may choose, based on a type of the power grid and an actual requirement, to be coupled and connected to the L phase in the power grid or one, two, or three of the phases A, B, and C, to obtain a voltage. Therefore, more options can be provided for the power-obtaining connection manner of the voltage compensation apparatus.

In an implementation, if a compensation voltage corresponding to the photovoltaic panel string is a forward voltage, a positive pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a negative pole of the power output terminal of the voltage compensation apparatus is coupled and connected to the N wire in the power grid; or if a compensation voltage corresponding to the photovoltaic panel string is a reverse voltage, a negative pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a positive pole of the power output terminal of the voltage compensation apparatus is coupled and connected to the N wire in the power grid.

In this way, a correct connection manner may be selected based on a type of a voltage by using which compensation needs to be actually performed for the photovoltaic panel string, to improve a voltage compensation effect.

In an implementation, the power conversion module is an isolated AC/DC conversion unit.

In an implementation, the coupling connection is at least one of the following connection manners: a direct coupling connection, a coupling connection implemented by using a switching device, a coupling connection implemented by using a current limiting component, and a coupling connection implemented by using a switching device and a current limiting component.

In this way, a user may flexibly select an appropriate coupling connection manner based on a requirement.

In an implementation, the switching device is one or a combination of a semiconductor switch, a relay, a contactor, a circuit breaker, and a mechanical switch.

In this way, an appropriate switching device may be selected based on an actual requirement, for example, costs or a security rule.

In an implementation, the current limiting component is a resistor, an inductor, or a current limiting circuit.

According to a second aspect, an embodiment may provide an inverter apparatus. The inverter apparatus includes an inverter and the voltage compensation apparatus according to the first aspect. The inverter includes a housing, a power input terminal, a power output terminal, an inverter unit, and a grid-connected switch unit. The power input terminal and the power output terminal are disposed on the housing. The power input terminal is configured to be coupled and connected to a power output terminal of a photovoltaic panel string. The power output terminal is configured to be coupled and connected to a power grid. All of the inverter unit, the grid-connected switch unit, and the voltage compensation apparatus are disposed in the inverter. A power input terminal of the inverter unit is coupled and connected to the power input terminal. A power output terminal of the inverter unit is coupled and connected to the power output terminal by using the grid-connected switch unit. A power input terminal of the voltage compensation apparatus is coupled and connected to a loop between the grid-connected switch unit and the power output terminal. One pole of a power output terminal of the voltage compensation apparatus is coupled and connected to a power output terminal coupled and connected to an N wire in the power grid, and/or is coupled and connected to a coupling loop that is in the inverter and that corresponds to the power output terminal coupled and connected to the N wire in the power grid. The other pole of the power output terminal of the voltage compensation apparatus is coupled and connected to the power input terminal of the inverter, the power input terminal of the inverter unit in the inverter, and/or a loop between the power input terminal and the power input terminal of the inverter unit.

In this way, the inverter may be used in a photovoltaic power generation system, and the inverter may simultaneously implement effects of converting a direct current sent by the photovoltaic panel string into an alternating current and compensating for a voltage of the photovoltaic panel string. One pole of the power output terminal of the voltage compensation apparatus is coupled and connected to the N wire in the power grid, to implement grounding, and there is no need to form a voltage compensation loop based on a grounding wire of the inverter. Therefore, even if a connection of the grounding wire of the inverter is missed or there is relatively poor connection quality, voltage compensation can still be performed for the photovoltaic panel string, and an electric shock risk to a person can be avoided.

In an implementation, if a compensation voltage corresponding to the photovoltaic panel string is a forward voltage, a positive pole of the power output terminal of the voltage compensation apparatus is coupled and connected to the power input terminal of the inverter, the power input terminal of the inverter unit in the inverter, and/or the loop between the power input terminal of the inverter and the power input terminal of the inverter unit, and a negative pole of the power output terminal of the voltage compensation apparatus is coupled and connected to the power output terminal coupled and connected to the N wire in the power grid, and/or is coupled and connected to the coupling loop that is in the inverter and that corresponds to the power output terminal coupled and connected to the N wire in the power grid; or if a compensation voltage corresponding to the photovoltaic panel string is a reverse voltage, a negative pole of the power output terminal of the voltage compensation apparatus is coupled and connected to the power input terminal of the inverter, the power input terminal of the inverter unit in the inverter, and/or the loop between the power input terminal of the inverter and the power input terminal of the inverter unit, and a positive pole of the power output terminal of the voltage compensation apparatus is coupled and connected to the power output terminal coupled and connected to the N wire in the power grid, and/or is coupled and connected to the coupling loop that is in the inverter and that corresponds to the power output terminal coupled and connected to the N wire in the power grid.

In this way, an appropriate power-obtaining connection manner may be selected for the voltage compensation apparatus based on a position at which the voltage compensation apparatus is disposed.

In an implementation, power input terminals of the voltage compensation apparatus are respectively coupled and connected to at least one of phases A, B, and C in the power grid and the N wire in the power grid; or power input terminals of the voltage compensation apparatus are connected to at least two of phases A, B, and C in the power grid; or power input terminals of the voltage compensation apparatus are coupled and connected to an L phase in the power grid and the N wire in the power grid.

In this way, the voltage compensation apparatus may choose, based on a type of the power grid and an actual requirement, to be coupled and connected to the L phase in the power grid or one, two, or three of the phases A, B, and C, to obtain a voltage. Therefore, more options can be provided for the power-obtaining connection manner of the voltage compensation apparatus.

In an implementation, the inverter further includes a direct current/direct current DC/DC voltage conversion unit; an input terminal of the direct current/direct current DC/DC voltage conversion unit is coupled and connected to the power input terminal; and an output terminal of the direct current/direct current DC/DC voltage conversion unit is coupled and connected to the input terminal of the inverter unit.

In this way, the direct current/direct current DC/DC voltage conversion unit may convert a direct current obtained after conversion into a voltage suitable for use on a side of the photovoltaic panel string.

In an implementation, the voltage compensation apparatus includes a power conversion module; the power conversion module is coupled to the power input terminal of the voltage compensation apparatus and the power output terminal of the voltage compensation apparatus; and the power conversion module is an isolated AC/DC conversion unit.

In this way, the voltage compensation apparatus may obtain a voltage from the power grid by using the power input terminal, transfer the obtained voltage to the photovoltaic panel string by using the power conversion module, and finally be connected to the N wire in the power grid by using the power output terminal, to implement a voltage compensation loop to implement voltage compensation for the photovoltaic panel string and convert an alternating current voltage into a direct current voltage.

In an implementation, the coupling connection is at least one of the following connection manners: a direct coupling connection, a coupling connection implemented by using a switching device, a coupling connection implemented by using a current limiting component, and a coupling connection implemented by using a switching device and a current limiting component.

In this way, a user may flexibly select an appropriate coupling connection manner based on a requirement.

In an implementation, the switching device is one or a combination of a semiconductor switch, a relay, a contactor, a circuit breaker, and a mechanical switch.

In this way, an appropriate switching device may be selected based on an actual requirement, for example, costs or a security rule.

In an implementation, the current limiting component is a resistor, an inductor, or a current limiting circuit.

In an implementation, the inverter further includes a control unit; and the control unit is coupled and connected to the inverter unit, the direct current/direct current DC/DC conversion unit, the grid-connected switch unit, and the voltage compensation apparatus.

In this way, the inverter unit, the direct current/direct current DC/DC conversion unit, the grid-connected switch unit, and the voltage compensation apparatus can be automatically controlled by using the control unit, to improve precision of controlling the inverter.

According to a third aspect, an embodiment may provide a photovoltaic power generation system. The photovoltaic power generation system includes a photovoltaic panel string and an inverter apparatus. The inverter apparatus includes an inverter and the voltage compensation apparatus according to the first aspect. A power output terminal of the photovoltaic panel string is coupled and connected to a power input terminal of the inverter. A power output terminal of the inverter is coupled and connected to a power grid. A power input terminal of the voltage compensation apparatus is coupled and connected to the power grid and is configured to obtain power from the power grid. One pole of a power output terminal of the voltage compensation apparatus is coupled and connected to the power output terminal of the photovoltaic panel string, the power input terminal of the inverter, a power input terminal of an inverter unit in the inverter, and/or a loop between the power input terminal of the inverter and the power input terminal of the inverter unit. The other pole of the power output terminal of the voltage compensation apparatus is coupled and connected to an N wire in the power grid, and is configured to apply the power obtained from the power grid between the power output terminal of the photovoltaic panel string and the ground.

In this way, when the photovoltaic panel string does not generate power, the voltage compensation apparatus may obtain power from the power grid, and then compensate for a bias voltage consumed by the photovoltaic panel string to ground, to repair a power attenuation phenomenon occurring in the photovoltaic panel string. In addition, the power output terminal of the voltage compensation apparatus is directly coupled and connected to an N pole in the power grid, to form a power compensation loop, and there is no need to form a power compensation loop based on a grounding wire of the inverter. Therefore, even if a connection of the grounding wire of the inverter is missed or there is relatively poor connection quality, voltage compensation can still be performed for the photovoltaic panel string, and an electric shock risk to a person can be avoided.

In an implementation, if the voltage compensation apparatus is disposed in the inverter, the power input terminal of the voltage compensation apparatus is coupled and connected to a loop between a grid-connected switch unit in the inverter and a power output terminal of the inverter; or if the voltage compensation apparatus is disposed outside the inverter, the power input terminal of the voltage compensation apparatus is coupled and connected to a power output terminal of the inverter or is coupled and connected to the power grid located outside the inverter.

In this way, an appropriate power-obtaining connection manner may be selected for the voltage compensation apparatus based on a position at which the voltage compensation apparatus is disposed.

In an implementation, power input terminals of the voltage compensation apparatus are respectively coupled and connected to at least one of phases A, B, and C in the power grid and the N wire in the power grid; or power input terminals of the voltage compensation apparatus are connected to at least two of phases A, B, and C in the power grid; or power input terminals of the voltage compensation apparatus are coupled and connected to an L phase in the power grid and the N wire in the power grid.

In this way, the voltage compensation apparatus may choose, based on a type of the power grid and an actual requirement, to be coupled and connected to the L phase in the power grid or one, two, or three of the phases A, B, and C, to obtain a voltage. Therefore, more options can be provided for the power-obtaining connection manner of the voltage compensation apparatus.

In an implementation, if a compensation voltage corresponding to the photovoltaic panel string is a forward voltage, a positive pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a negative pole of the power output terminal of the voltage compensation apparatus is coupled and connected to the N wire in the power grid; or if a compensation voltage corresponding to the photovoltaic panel string is a reverse voltage, a negative pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a positive pole of the power output terminal of the voltage compensation apparatus is coupled and connected to the N wire in the power grid.

In this way, a correct connection manner may be selected based on a type of a voltage by using which compensation needs to be actually performed for the photovoltaic panel string, to improve a voltage compensation effect.

In an implementation, the voltage compensation apparatus includes a power conversion module; the power conversion module is coupled to the power input terminal of the voltage compensation apparatus and the power output terminal of the voltage compensation apparatus; and the power conversion module is an isolated AC/DC conversion unit.

In this way, the voltage compensation apparatus may obtain a voltage from the power grid by using the power input terminal, transfer the obtained voltage to the photovoltaic panel string by using the power conversion module, and finally be connected to the N wire in the power grid by using the power output terminal, to implement a voltage compensation loop to implement voltage compensation for the photovoltaic panel string and convert an alternating current voltage into a direct current voltage.

In an implementation, the coupling connection is a direct coupling connection, a coupling connection implemented by using a switching device, a coupling connection implemented by using a current limiting component, or a coupling connection implemented by using a switching device and a current limiting component.

In this way, a user may flexibly select an appropriate coupling connection manner based on a requirement.

In an implementation, the switching device is one or a combination of a semiconductor switch, a relay, a contactor, a circuit breaker, and a mechanical switch.

In this way, an appropriate switching device may be selected based on an actual requirement, for example, costs or a security rule.

In an implementation, the current limiting component is a resistor, an inductor, or a current limiting circuit.

In an implementation, the system further includes a controller; and the controller is coupled to and communicates with the inverter and the voltage compensation apparatus and is configured to turn on and turn off the inverter and the voltage compensation apparatus.

In this way, the inverter and the voltage compensation apparatus can be automatically controlled by using the controller, to improve precision of controlling a voltage compensation process.

BRIEF DESCRIPTION OF THE DRAWINGS

To describe the embodiments, the following briefly describes the accompanying drawings. It is clear that a person of ordinary skill in the art may derive other drawings from these accompanying drawings without creative efforts.

DETAILED DESCRIPTION OF THE EMBODIMENTS

The following clearly describes the embodiments with reference to the accompanying drawings. Apparently, the described embodiments are merely a part rather than all of the embodiments. All other embodiments obtained by a person of ordinary skill in the art based on the embodiments without creative efforts shall fall within the scope of the embodiments.

Figure 1:
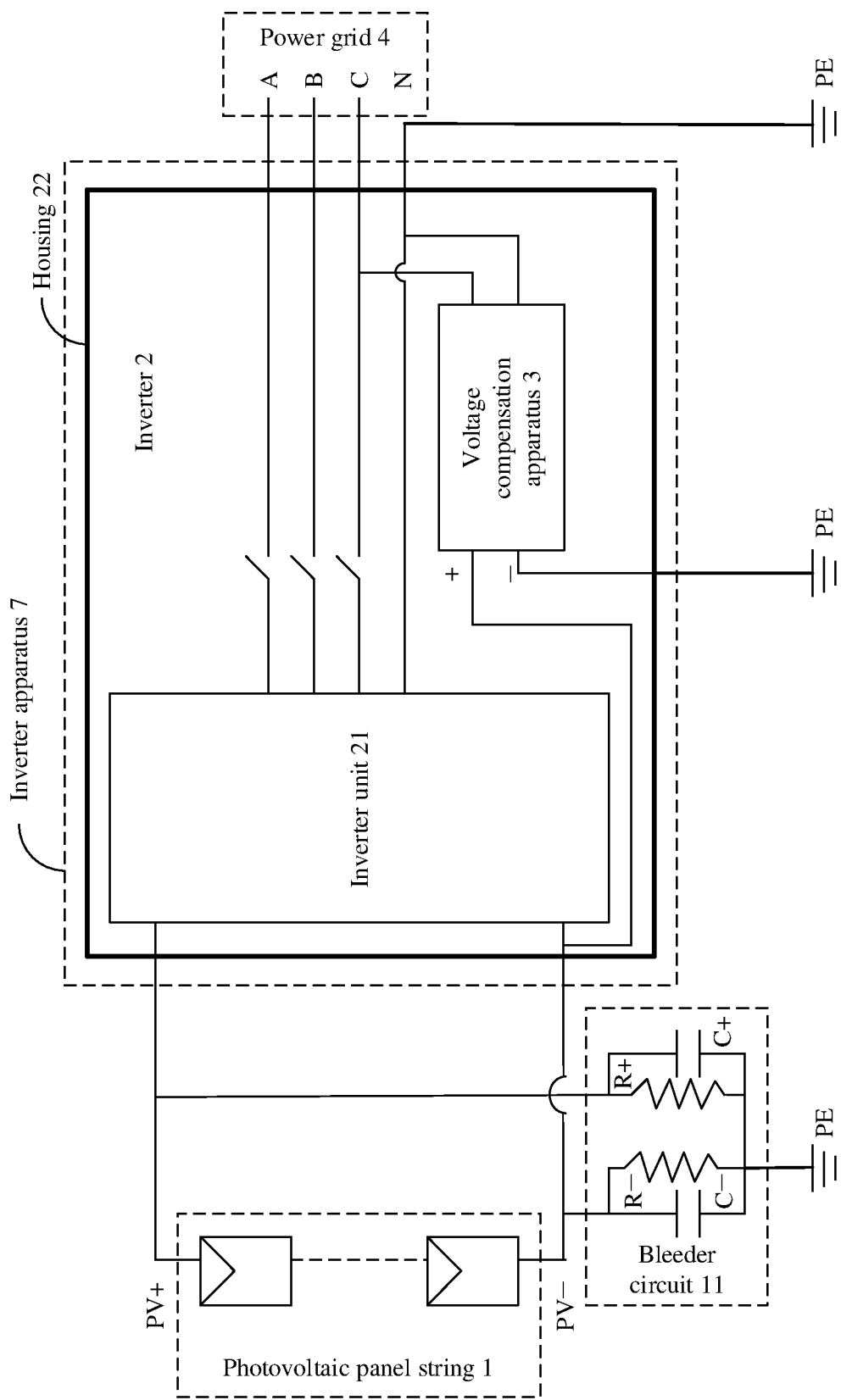
FIG. 1 is a schematic diagram of a structure of a photovoltaic power generation system.

FIG. 1 is a schematic diagram of a structure of a photovoltaic power generation system. As shown in FIG. 1, the photovoltaic power generation system includes a photovoltaic panel string 1 and an inverter apparatus 7. The inverter apparatus 7 includes an inverter 2 and a voltage compensation apparatus 3. A power output terminal of the photovoltaic panel string 1 is coupled and connected to a power input terminal of the inverter 2, so that the photovoltaic panel string 1 can transmit a generated direct current to the inverter 2. In addition, a negative pole PV− of the power output terminal of the photovoltaic panel string 1 is grounded. The inverter 2 may convert, by using an inverter unit 21, for example, a direct current/alternating current (Direct Current/Alternating Current, DC/AC) conversion unit, a received direct current into an alternating current that meets a requirement of a power grid, and a power output terminal of the inverter 2 is coupled and connected to a power grid 4. In this way, the inverter 2 may transmit the alternating current obtained after conversion to the power grid 4, and then the power grid 4 transmits the alternating current to each power consumption unit. In addition, the inverter 2 may be grounded by using a housing 22, to ensure use safety. A power generation process of the photovoltaic power generation system may be completed by performing the foregoing process.

However, a photovoltaic array that includes a series/parallel structure of photovoltaic modules in the photovoltaic panel string 1 causes parasitic capacitance and resistance to be generated between the power output terminal of the photovoltaic panel string 1 and the ground, in other words, a PID effect is generated. As shown in FIG. 1, there is parasitic capacitance C+ and parasitic resistance R+ between a positive pole PV+ of the power output terminal of the photovoltaic panel string 1 and the ground, and there is parasitic capacitance C− and parasitic resistance R− between the negative pole PV− of the power output terminal of the photovoltaic panel string 1 and the ground. The parasitic capacitance and resistance implement a voltage division function for the photovoltaic panel string 1, and the parasitic capacitance and resistance may be shown by using a bleeder circuit 11 in FIG. 1. Due to existence of the bleeder circuit, the photovoltaic panel string 1 generates a bias voltage to ground, and consequently a power attenuation phenomenon occurs in the photovoltaic panel string 1 under the action of the bias voltage, in other words, the PID effect occurs. To reduce impact of the PID effect on the photovoltaic panel string 1, voltage compensation may be performed for the bias voltage between the power output terminal of the photovoltaic panel string 1 and the ground by using the voltage compensation apparatus 3, to reduce impact of the PID effect.

Figure 2:
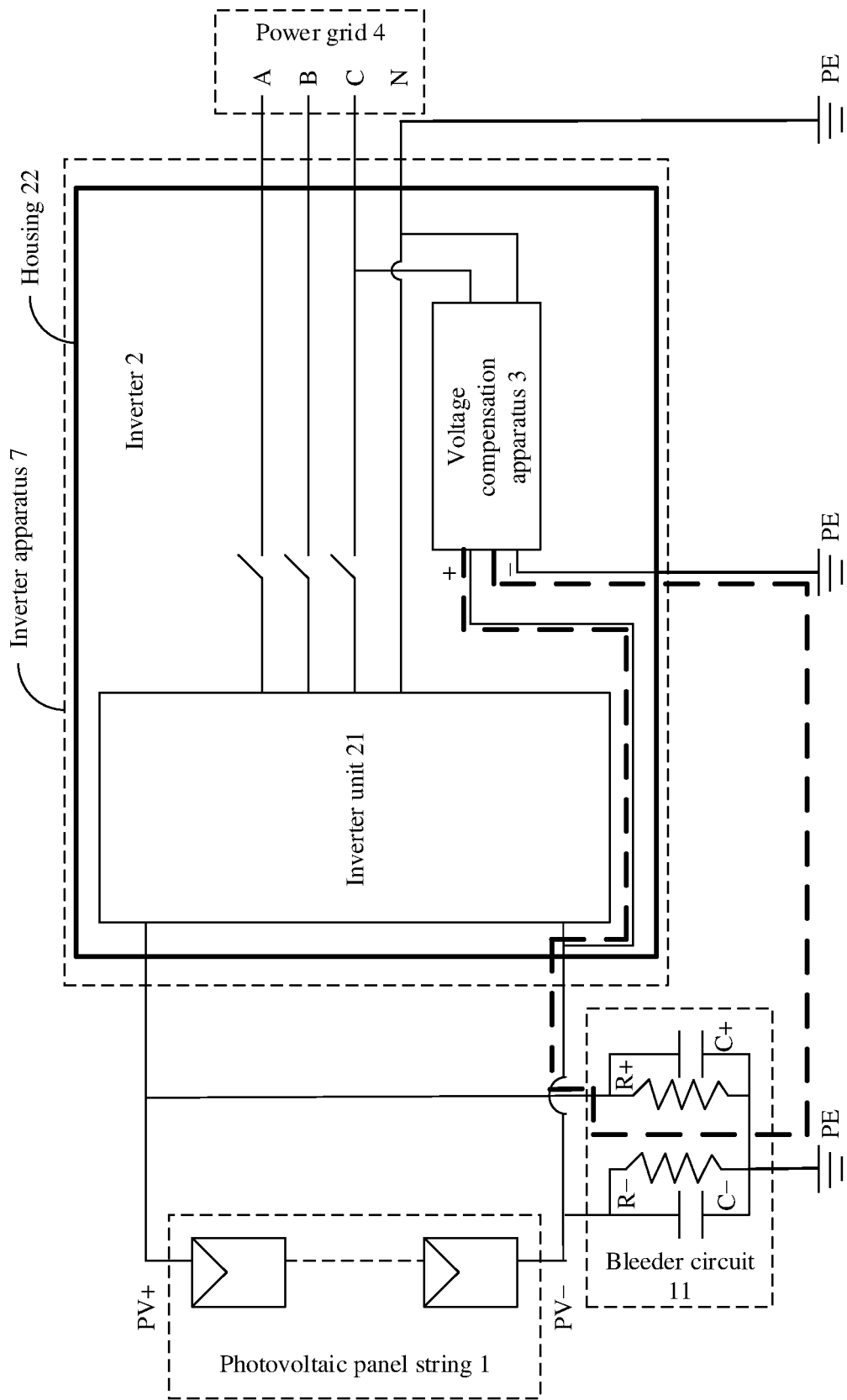
FIG. 2 is a schematic diagram of a voltage compensation loop.
Figure 3:
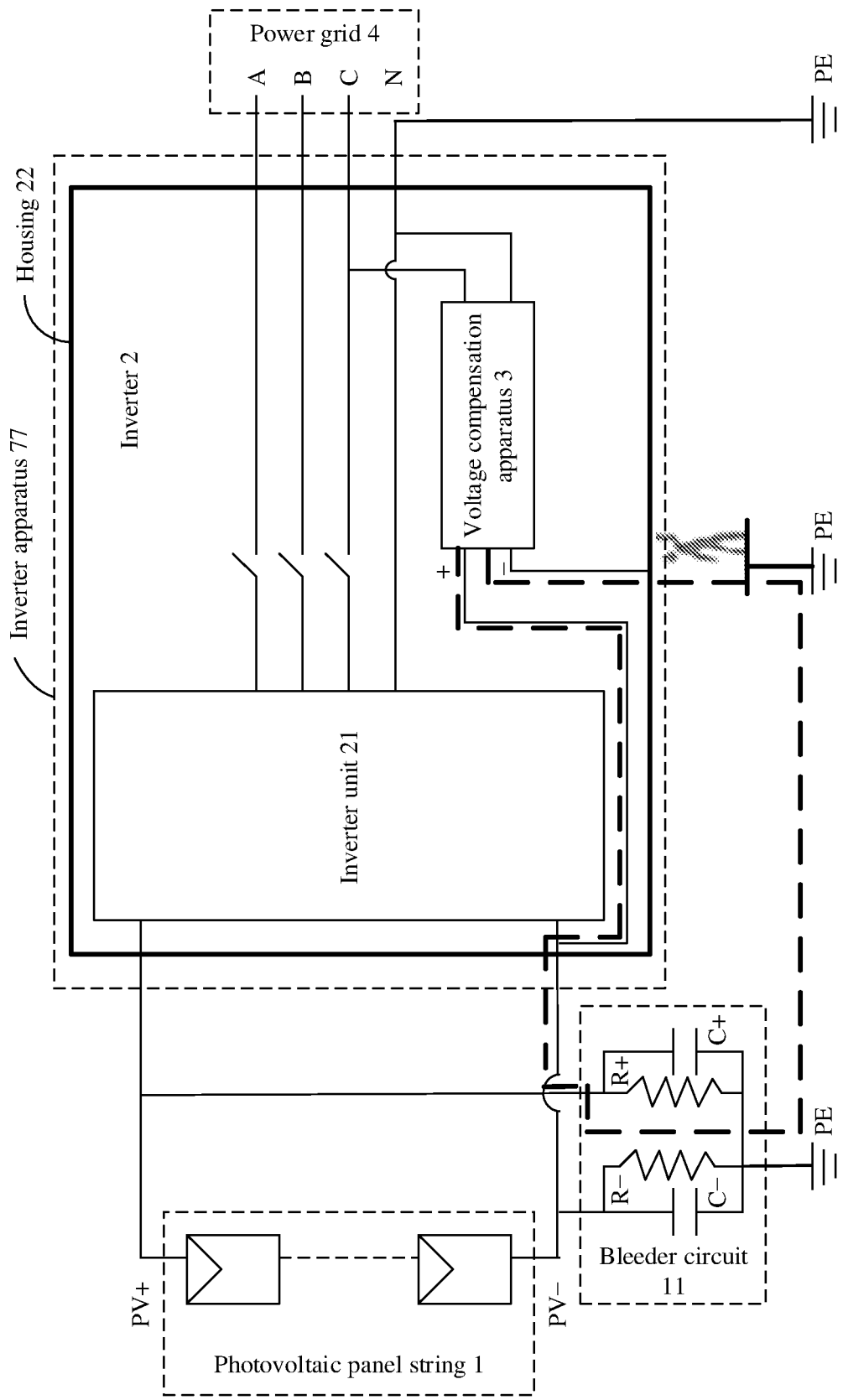
FIG. 3 is a schematic diagram of a human body contact.

As shown in FIG. 1, the voltage compensation apparatus 3 is disposed in the inverter 2, and a power input terminal of the voltage compensation apparatus 3 is coupled and connected to the power grid 4. After the photovoltaic panel string 1 stops power generation, the voltage compensation apparatus 3 starts to obtain power from the power grid 4. One pole of a power output terminal of the voltage compensation apparatus 3 is coupled and connected to one side of the photovoltaic panel string 1. In FIG. 1, an example in which one pole of the power output terminal of the voltage compensation apparatus 3 is coupled and connected to a loop between the power input terminal of the inverter 2 and an input terminal of the inverter unit 21 is used. In addition, the other pole of the power output terminal of the voltage compensation apparatus 3 is grounded by using the housing 22. FIG. 2 is a schematic diagram of a voltage compensation loop. As shown by a relatively thick dashed line in FIG. 2, a path between the voltage compensation apparatus 3 and the bleeder circuit 11, the bleeder circuit 11, PE, a path between the voltage compensation apparatus 3 and the housing 22 of the inverter 2, and a path between the housing 22 of the inverter 2 and the PE form a voltage compensation loop, to apply a compensation voltage between the power output terminal of the photovoltaic panel string 1 and the PE to compensate for the bias voltage. It may be understood from composition of the voltage compensation loop that if the voltage compensation apparatus 3 wants to implement voltage compensation for the bias voltage, grounding quality of the housing 22 of the inverter 2 needs to be ensured. If a connection of a grounding wire is missed or there is relatively poor grounding quality, the voltage compensation loop is broken, and consequently the voltage compensation apparatus 3 cannot perform voltage compensation for the bias voltage, and the impact of the PID effect on the photovoltaic panel string 1 cannot be eliminated. In addition, as shown in FIG. 3, once a person comes into contact with the housing 22 of the inverter 2 without protection, the housing 22 is grounded by using a human body. In this case, the PE and the housing 22 of the inverter 2 in the voltage compensation loop are connected by using the human body, and a current passes through the human body, and consequently great harm is caused to the person.

In a method in which the voltage compensation apparatus 3 is grounded by using the inverter 2, to form a voltage compensation loop, there is a problem that the voltage compensation loop fails or there is harm to personal safety.

The embodiments may provide a photovoltaic power generation system. The system includes a photovoltaic panel string and an inverter apparatus. The inverter apparatus includes an inverter and a voltage compensation apparatus. A power output terminal of the photovoltaic panel string is coupled and connected to a power input terminal of the inverter. A power output terminal of the inverter is coupled and connected to a power grid. A power input terminal of the voltage compensation apparatus is coupled and connected to the power grid, and is configured to obtain power from the power grid. One pole of a power output terminal of the voltage compensation apparatus is coupled and connected to the power output terminal of the photovoltaic panel string, the power input terminal of the inverter, a power input terminal of an inverter unit in the inverter, and/or a loop between the power input terminal of the inverter and the power input terminal of the inverter unit. The other pole of the power output terminal of the voltage compensation apparatus is coupled and connected to an N wire in the power grid, and is configured to apply the power obtained from the power grid between the power output terminal of the photovoltaic panel string and the ground.

Embodiment 1

Figure 4:
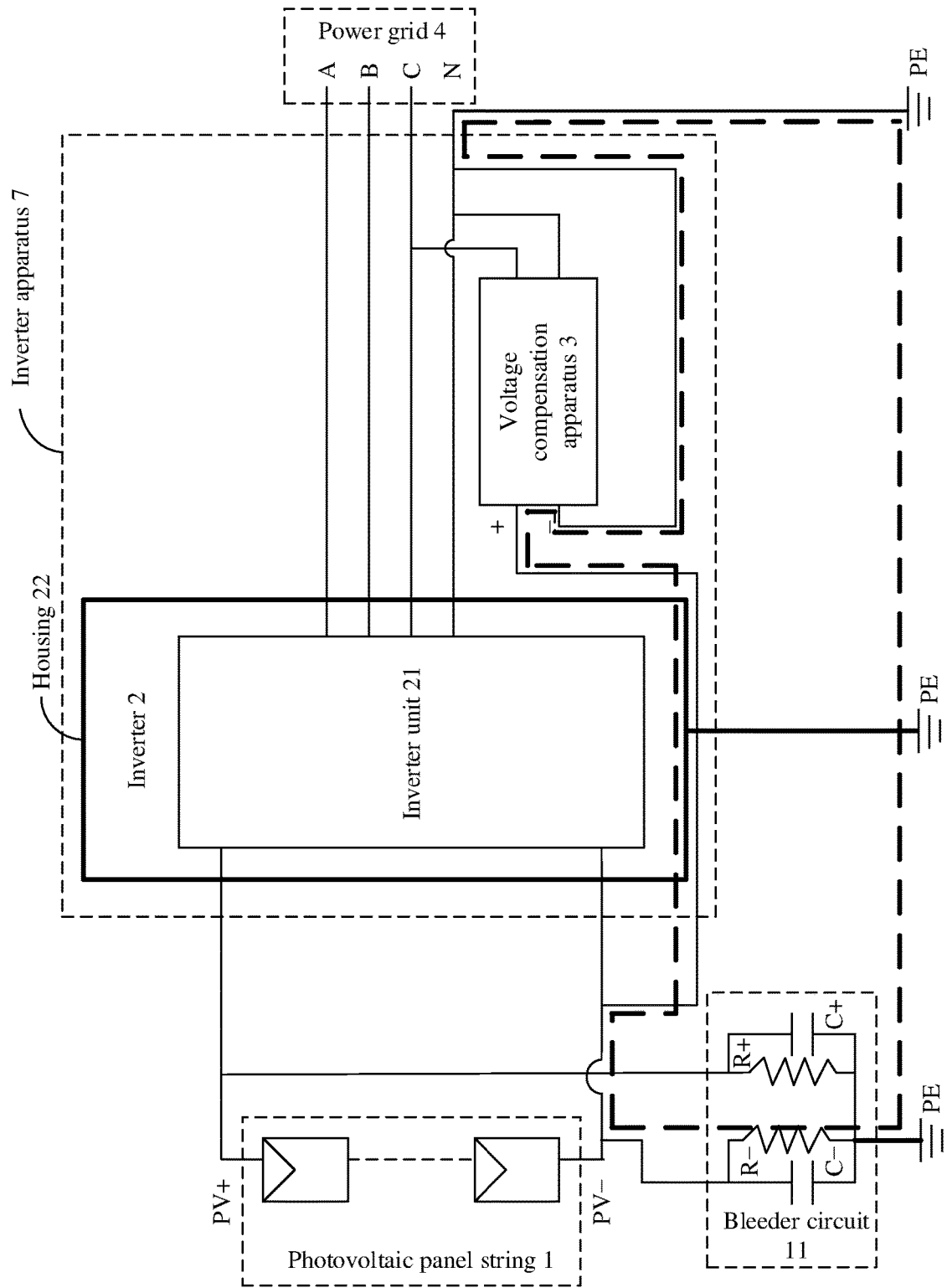
FIG. 4 is a schematic diagram of a structure of a photovoltaic power generation system according to an embodiment.

FIG. 4 is a schematic diagram of a structure of a photovoltaic power generation system according to this embodiment. As shown in FIG. 4, in this embodiment, in an inverter apparatus 7, an inverter 2 and a voltage compensation apparatus 3 are two independent devices, and the voltage compensation apparatus 3 is disposed outside the inverter 2. One pole of a power output terminal of the voltage compensation apparatus 3 is coupled and connected to an N wire in a power grid 4, to implement grounding. The other pole of the power output terminal of the voltage compensation apparatus 3 may be coupled and connected to a power output terminal of a photovoltaic panel string 1, a power input terminal of the inverter 2, a power input terminal of an inverter unit 21 in the inverter 2, and/or a loop between the power input terminal of the inverter 2 and the power input terminal of the inverter unit 21. In an implementation, the other pole of the power output terminal of the voltage compensation apparatus 3 may be coupled and connected only to the power output terminal of the photovoltaic panel string 1, the power input terminal of the inverter 2, the power input terminal of the inverter unit 21 in the inverter 2, or the loop between the power input terminal of the inverter 2 and the power input terminal of the inverter unit 21. In another implementation, the other pole of the power output terminal of the voltage compensation apparatus 3 may alternatively be simultaneously coupled and connected to any two or more of the power output terminal of the photovoltaic panel string 1, the power input terminal of the inverter 2, the power input terminal of the inverter unit 21 in the inverter 2, and the loop between the power input terminal of the inverter 2 and the power input terminal of the inverter unit 21.

In FIG. 4, an example in which a positive pole of the power output terminal of the voltage compensation apparatus 3 is coupled and connected to a power input terminal of the photovoltaic panel string 1 is used. In this embodiment, the power input terminal of the photovoltaic panel string 1 includes a device of the power input terminal and a loop between the device and the power input terminal of the inverter 2. In this way, as shown by a relatively thick dashed line in FIG. 4, a path between the positive pole of the power output terminal of the voltage compensation apparatus 3 and the power output terminal of the photovoltaic panel string 1, a bleeder circuit 11, PE, a path between a negative pole of the power output terminal of the voltage compensation apparatus 3 and the N wire, and a path between the N wire and the PE form a voltage compensation loop. After obtaining power from the power grid 4, the voltage compensation apparatus 3 may apply the obtained power between the power output terminal of the photovoltaic panel string 1 and the PE by using the voltage compensation loop, to implement voltage compensation for a bias voltage between the power output terminal of the photovoltaic panel string 1 and the PE, so as to reduce impact of a PID effect on the photovoltaic panel string 1.

The power output terminal of the voltage compensation apparatus 3 is coupled and connected to the N wire in the power grid 4, to implement grounding, and therefore grounding does not need to be implemented by using a housing 22 of the inverter 2. In this way, even if working personnel forgets to ground the housing 22 of the inverter 2 or there is a problem such as a problem that a grounding wire of the housing 22 is faulty, if a user unintentionally comes into contact with the housing 22 of the inverter 2, no voltage compensation loop is formed by using a human body, and a current that is applied to the voltage compensation loop and that is obtained from the power grid 4 does not pass through the human body, and therefore no harm is caused to personal safety. In addition, even if the inverter 2 cannot be grounded, a voltage compensation effect of the voltage compensation apparatus 3 for the bias voltage is not affected, to ensure quality of eliminating the PID effect.

Further, grounding can be implemented when the power output terminal of the voltage compensation apparatus 3 is coupled and connected to the N wire in the power grid 4, and therefore no additional wire is required to implement grounding. In this way, a connection workload and costs can be reduced, and a potential safety risk caused by an additional grounding wire can be avoided.

A power input terminal of the voltage compensation apparatus 3 is coupled and connected to a power output terminal of the inverter 2 or is coupled and connected to the power grid 4 located outside the inverter 2, to obtain power. In FIG. 4, an example in which the power input terminal of the voltage compensation apparatus 3 is coupled and connected to the power grid 4 located outside the inverter 2, to obtain power is used.

Figure 5:
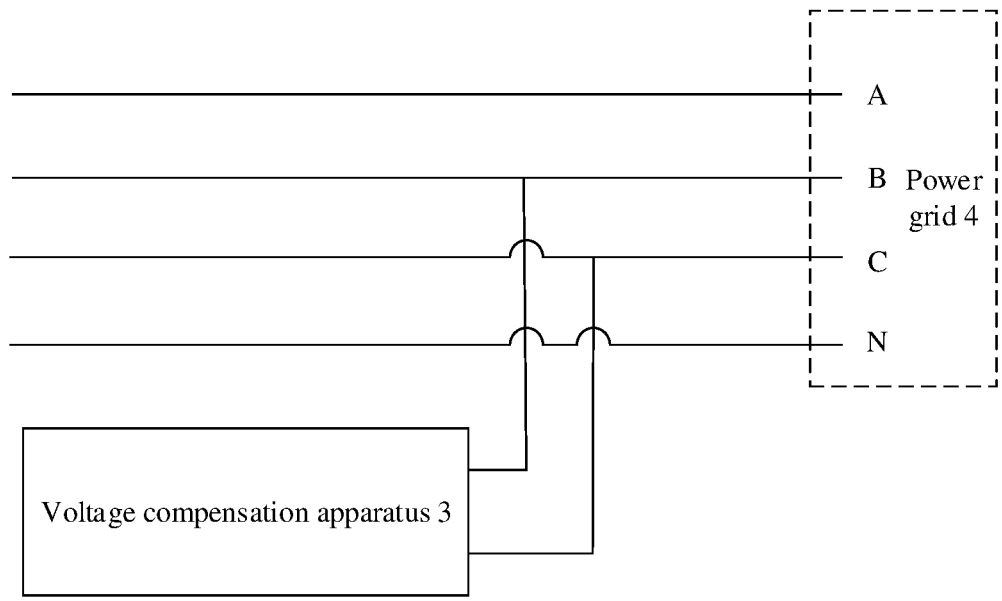
FIG. 5 is a schematic diagram of a structure of obtaining power by implementing coupling and connection to two phases in a power grid that includes phases A, B, and C according to an embodiment.

If the power grid 4 is a power grid that includes phases A, B, and C, as shown in FIG. 4, the inverter 2 is a three-phase inverter, and power input terminals of the voltage compensation apparatus 3 may be coupled and connected to any one of the three phases A, B, and C in the power grid 4 and the N wire in the power grid, to obtain power. Details are as follows:

In an implementation, FIG. 4 shows an example in which the voltage compensation apparatus 3 obtains power from the power grid 4 by using one phase. It may be understood that one of the power input terminals of the voltage compensation apparatus 3 is coupled and connected to the phase C in the phases A, B, and C in the power grid 4, and the other of the power input terminals of the voltage compensation apparatus 3 is coupled and connected to the N wire in the power grid 4, to obtain power from C and N. In addition, one of the power input terminals of the voltage compensation apparatus 3 may alternatively be coupled and connected to the phase A or the phase B, and the other power input terminal may be coupled and connected to the N wire, to obtain power from A and N or from B and N. In an implementation, FIG. 5 is a schematic diagram of a structure of obtaining power by implementing coupling and connection to two phases in the power grid according to an embodiment. FIG. 5 shows only a coupling connection relationship between the power input terminal of the voltage compensation apparatus 3 and the power grid 4. For another structure in the photovoltaic power generation system, refer to FIG. 4. No description is provided in this figure. As shown in FIG. 5, one of power input terminals of the voltage compensation apparatus 3 is coupled and connected to the phase B in the power grid 4, and the other of the power input terminals of the voltage compensation apparatus 3 is coupled and connected to the phase C in the power grid 4. In this way, the voltage compensation apparatus 3 may obtain power from B and C. In addition, power input terminals in the power input terminals of the voltage compensation apparatus 3 may be alternatively respectively coupled and connected to any two of the phases A, B, and C, to obtain power from A and B or from A and C. Further, the voltage compensation apparatus 3 may further be coupled and connected to the N wire in the power grid 4 in addition to being coupled and connected to any two of the phases A, B, and C, to obtain power from A, B, and N, from A, C, and N, or from B, C, and N. The voltage compensation apparatus 3 may alternatively choose, based on an actual situation, not to be connected to the N wire.

Figure 6:
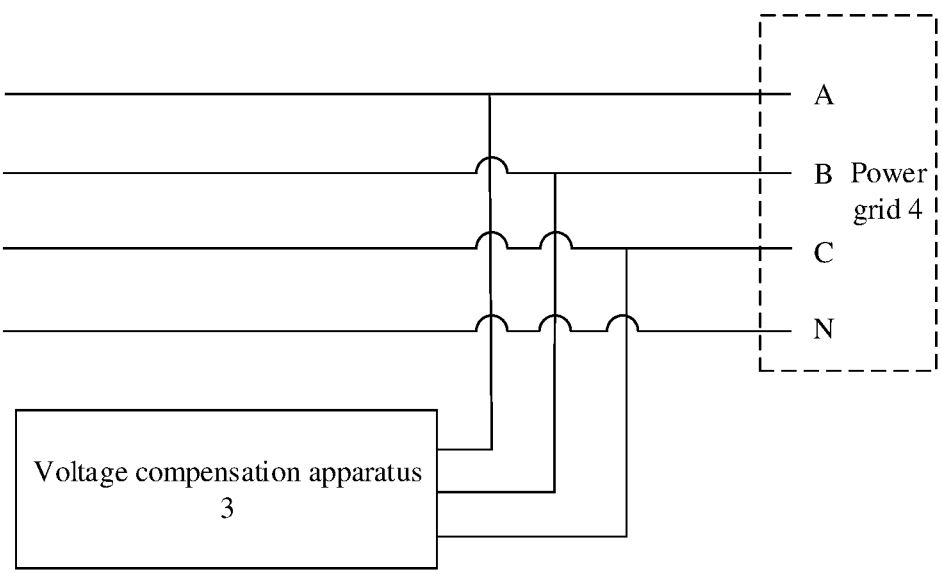
FIG. 6 is a schematic diagram of a structure of obtaining power by implementing coupling and connection to three phases in a power grid that includes phases A, B, and C according to an embodiment.

In an implementation, FIG. 6 is a schematic diagram of a structure of obtaining power by implementing coupling and connection to three phases in the power grid according to an embodiment. FIG. 6 shows only a coupling connection relationship between the power input terminal of the voltage compensation apparatus 3 and the power grid 4. For another structure in the photovoltaic power generation system, refer to FIG. 4. No description is provided in this figure. As shown in FIG. 6, three power input terminals in power input terminals of the voltage compensation apparatus 3 are respectively coupled and connected to the three phases A, B, and C in the power grid 4. In this way, the voltage compensation apparatus 3 may obtain power from A, B, and C. In addition, the voltage compensation apparatus 3 may further be coupled and connected to the N wire in the power grid 4 in addition to being coupled and connected to the phases A, B, and C, to obtain power from A, B, C, and N.

Figure 7:
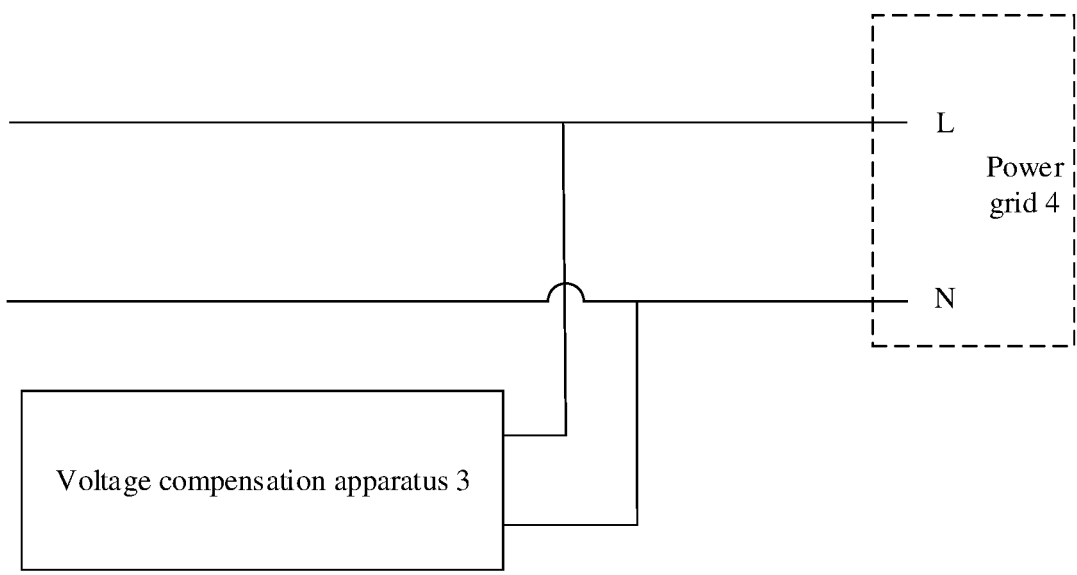
FIG. 7 is a schematic diagram of a structure of obtaining power by implementing coupling and connection to an L phase and an N wire in a power grid that includes the L phase and the N wire according to an embodiment.

If the power grid is a power grid that includes an L phase and an N wire, a case is shown in FIG. 7. For another structure in the photovoltaic power generation system, refer to FIG. 4. No description is provided in this figure. The power input terminal of the voltage compensation apparatus 3 needs to be connected to the L phase and the N wire in the power grid.

A connection manner between the power input terminal of the voltage compensation apparatus 3 and the power grid 4 may be selected based on an actual requirement. When the voltage compensation apparatus 3 and the inverter 2 are two independent devices, there may be a more flexible connection manner for the voltage compensation apparatus 3.

A corresponding type may be used for the photovoltaic panel string 1 based on an actual requirement, for example, a P-type photovoltaic panel string or an N-type photovoltaic panel string. A type of a bias voltage between the photovoltaic panel string 1 and the PE varies with a type of the photovoltaic panel string 1. Therefore, there is a different type of compensation voltage used to compensate for the generated bias voltage. For example, if the photovoltaic panel string 1 is a P-type photovoltaic panel string, there is usually a bias voltage that is a reverse voltage between the power output terminal of the photovoltaic panel string 1 and the PE. For most N-type photovoltaic panel strings, there is usually also a bias voltage that is a reverse voltage between the power output terminal of the photovoltaic panel string 1 and the PE. However, for a few N-type photovoltaic panel strings, there is a bias voltage that is a forward voltage between the power output terminal of the photovoltaic panel string 1 and the PE.

To accurately compensate for the bias voltage generated by the power output terminal of the photovoltaic panel string 1 to the PE, it needs to be ensured that an appropriate connection manner is used for the voltage compensation apparatus 3, to meet a type of the compensation voltage that matches the bias voltage. Details are as follows:

In an implementation, if the type corresponding to the photovoltaic panel string 1 is a P-type photovoltaic panel string or most N-type photovoltaic panel strings, it indicates that the power output terminal of the photovoltaic panel string 1 generates a bias voltage that is a reverse voltage to the PE. Based on a PID reversible principle, a compensation voltage required in this case is a forward voltage. In this case, to obtain a compensation voltage that is a forward voltage, the positive pole of the power output terminal of the voltage compensation apparatus 3 needs to be coupled and connected to the power output terminal of the photovoltaic panel string 1, the power input terminal of the inverter 2, the power input terminal of the inverter unit 21 in the inverter 2, and/or the loop between the power input terminal of the inverter 2 and the power input terminal of the inverter unit 21. For example, in FIG. 4, an example in which the positive pole of the power output terminal of the voltage compensation apparatus 3 is coupled and connected to a negative pole PV− of the power output terminal of the photovoltaic panel string 1, and the negative pole of the power output terminal of the voltage compensation apparatus 3 is coupled and connected to the N wire in the power grid 4 is used. In this case, a path between the positive pole of the power output terminal of the voltage compensation apparatus 3 and the negative pole PV− of the power output terminal of the photovoltaic panel string 1, the bleeder circuit 11, the PE, the path between the negative pole of the power output terminal of the voltage compensation apparatus 3 and the N wire, and the path between the N wire and the PE form a voltage compensation loop. Therefore, the power can be applied between PV− of the power output terminal of the photovoltaic panel string 1 and the PE by using the voltage compensation loop, to form a forward voltage between PV− of the power output terminal of the photovoltaic panel string 1 and the PE, so as to compensate for the bias voltage between PV− of the power output terminal of the photovoltaic panel string 1 and the PE by using the forward voltage.

When being coupled and connected to the power output terminal of the photovoltaic panel string 1, the positive pole of the power output terminal of the voltage compensation apparatus 3 may be coupled and connected to a positive pole PV+, the negative pole PV−, or both a positive pole and the negative pole of the power output terminal of the photovoltaic panel string 1. When being coupled and connected to the power input terminal of the inverter 2, the positive pole of the power output terminal of the voltage compensation apparatus 3 may be coupled and connected to a positive pole, a negative pole, or both a positive pole and a negative pole of the power input terminal of the inverter 2. When being coupled and connected to the power input terminal of the inverter unit 21 in the inverter 2, the positive pole of the power output terminal of the voltage compensation apparatus 3 may be coupled and connected to a positive pole or a negative pole of the power input terminal of the inverter unit 21, or both a positive pole and a negative pole of the power input terminal of the inverter unit 21. When being coupled and connected to the loop between the power input terminal of the inverter 2 and the power input terminal of the inverter unit 21, the positive pole of the power output terminal of the voltage compensation apparatus 3 may be coupled and connected to a loop corresponding to the positive pole, a loop corresponding to the negative pole, or both a loop corresponding to the positive pole and a loop corresponding to the negative pole of the power input terminal of the inverter 2.

Figure 8:
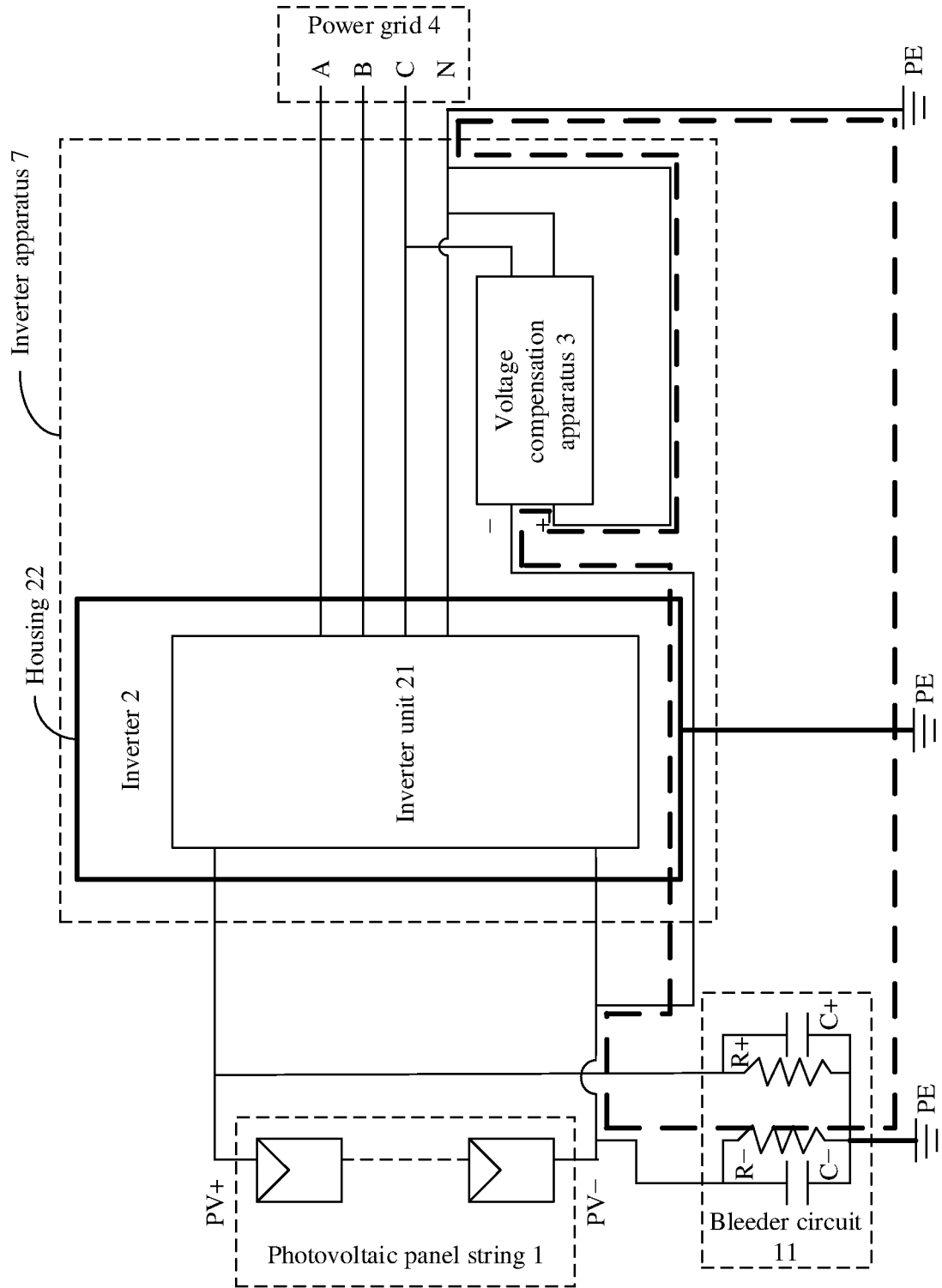
FIG. 8 is a schematic diagram of a structure of a photovoltaic power generation system according to an embodiment.

In another implementation, if the type corresponding to the photovoltaic panel string 1 is a few N-type photovoltaic panel strings, it indicates that the power output terminal of the photovoltaic panel string 1 generates a bias voltage that is a forward voltage to the PE. Based on a PID reversible principle, a compensation voltage required in this case is a reverse voltage. FIG. 8 is a schematic diagram of a structure of a photovoltaic power generation system according to an embodiment. As shown in FIG. 8, to obtain a compensation voltage that is a reverse voltage, the negative pole of the power output terminal of the voltage compensation apparatus 3 needs to be coupled and connected to the power output terminal of the photovoltaic panel string 1, the power input terminal of the inverter 2, the power input terminal of the inverter unit 21 in the inverter 2, and/or the loop between the power input terminal of the inverter 2 and the power input terminal of the inverter unit 21.

In FIG. 8, an example in which coupling and connection to a negative pole PV− of the power output terminal of the photovoltaic panel string 1 is implemented is used, and the positive pole of the power output terminal of the voltage compensation apparatus 3 is coupled and connected to the N wire in the power grid 4. In this case, a path between the negative pole of the power output terminal of the voltage compensation apparatus 3 and the negative pole PV− of the power output terminal of the photovoltaic panel string 1, the bleeder circuit 11, the PE, a path between the positive pole of the power output terminal of the voltage compensation apparatus 3 and the N wire, and the path between the N wire and the PE form a voltage compensation loop. Therefore, the obtained power can be applied between PV− of the power output terminal of the photovoltaic panel string 1 and the PE by using the voltage compensation loop, to form a reverse voltage between PV− of the power output terminal of the photovoltaic panel string 1 and the PE, so as to compensate for the bias voltage between PV− of the power output terminal of the photovoltaic panel string 1 and the PE by using the reverse voltage.

Optionally, the negative pole of the power output terminal of the voltage compensation apparatus 3 may be alternatively coupled and connected to the coupling connection position provided in the foregoing implementation. Details are not described herein.

Embodiment 2

Figure 9:
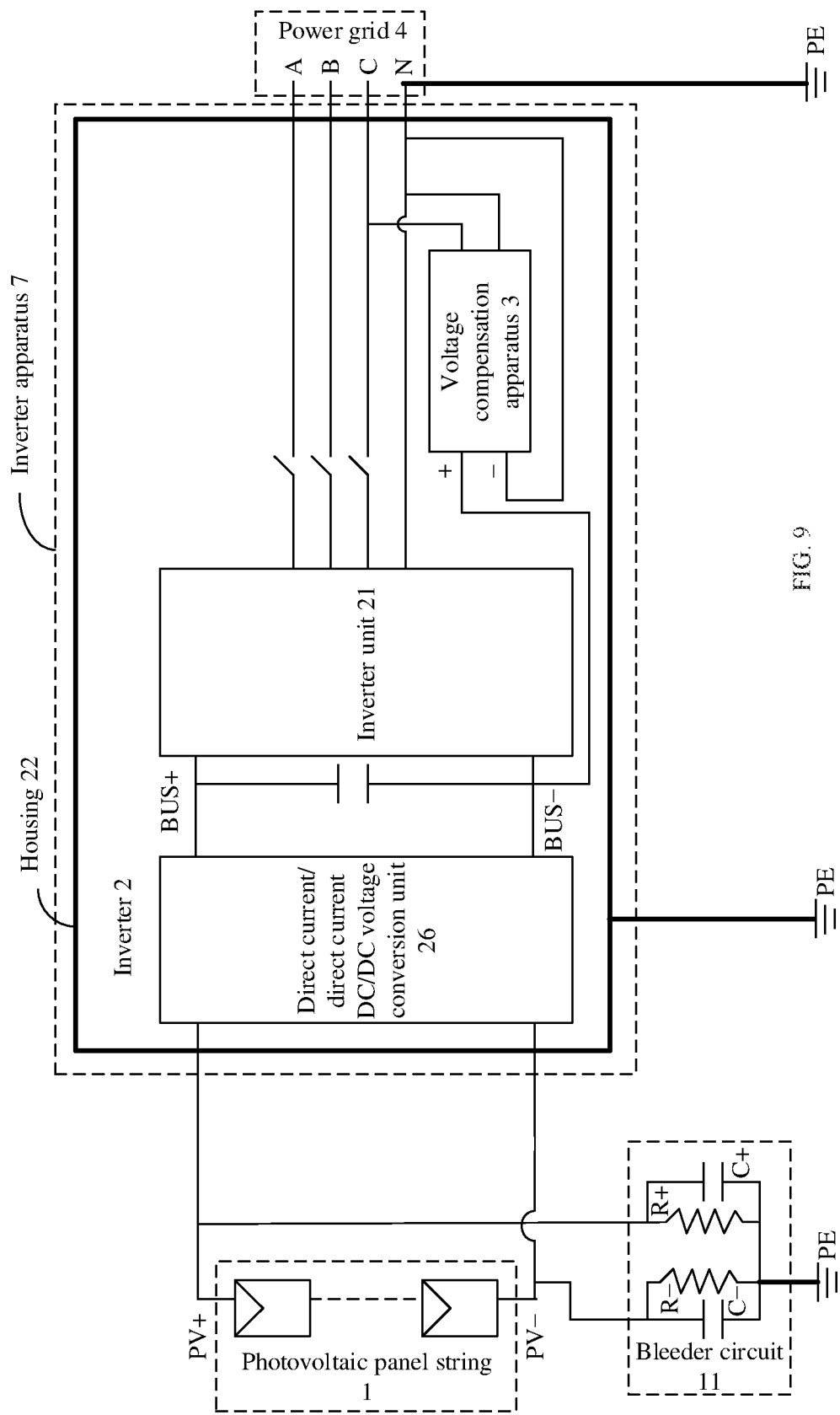
FIG. 9 is a schematic diagram of a structure of a photovoltaic power generation system according to an embodiment.

FIG. 9 is a schematic diagram of a structure of a photovoltaic power generation system according to this embodiment. A main difference between Embodiment 2 and Embodiment 1 lies in that as shown in FIG. 9, in an inverter apparatus 7, components such as a voltage compensation apparatus 3 and an inverter unit 21 are packaged into a housing 22 of an inverter 2. In this way, the inverter 2 is equivalent to an inverter with a voltage compensation function. In this case, a connection between the voltage compensation apparatus 3 and a device and a coupling loop in the inverter 2 is an internal connection of the inverter 2, and a connection between the voltage compensation apparatus 3 and a power output terminal of a photovoltaic panel string 1 is an external connection of the inverter 2. In this case, provided that a user selects an inverter 2 that includes an appropriate internal connection structure, during use of the inverter 2, an internal connection operation of the inverter 2 can be saved, and only an external connection operation of the inverter 2 needs to be performed.

The photovoltaic power generation system provided in this embodiment includes the photovoltaic panel string 1 and the inverter apparatus 7. The inverter apparatus 7 includes the inverter 2 and the voltage compensation apparatus 3. The power output terminal of the photovoltaic panel string 1 is coupled and connected to a power input terminal of the inverter 2. A power output terminal of the inverter 2 is coupled and connected to a power grid 4. A power input terminal of the voltage compensation apparatus 3 is coupled and connected to the power grid 4 and is configured to obtain power from the power grid 4. One pole of a power output terminal of the voltage compensation apparatus 3 may be coupled and connected to the power output terminal of the photovoltaic panel string 1, the power input terminal of the inverter 2, a power input terminal of the inverter unit 21 in the inverter 2, and/or a loop between the power input terminal of the inverter 2 and the power input terminal of the inverter unit 21. In an implementation, one pole of the power output terminal of the voltage compensation apparatus 3 may be coupled and connected only to the power output terminal of the photovoltaic panel string 1, the power input terminal of the inverter 2, the power input terminal of the inverter unit 21 in the inverter 2, or the loop between the power input terminal of the inverter 2 and the power input terminal of the inverter unit 21. In another implementation, one pole of the power output terminal of the voltage compensation apparatus 3 may alternatively be simultaneously coupled and connected to any two or more of the power output terminal of the photovoltaic panel string 1, the power input terminal of the inverter 2, the power input terminal of the inverter unit 21 in the inverter 2, and the loop between the power input terminal of the inverter 2 and the power input terminal of the inverter unit 21.

In FIG. 9, an example in which one pole of the power output terminal of the voltage compensation apparatus 3 is coupled and connected to the power input terminal of the inverter unit 21 in the inverter 2, for example, is coupled and connected to a direct current bus, and the other pole of the power output terminal of the voltage compensation apparatus 3 is coupled and connected to an N wire in the power grid 4 is used. In this way, the power obtained from the power grid 4 may be applied between the power output terminal of the photovoltaic panel string and the ground.

Figure 10:
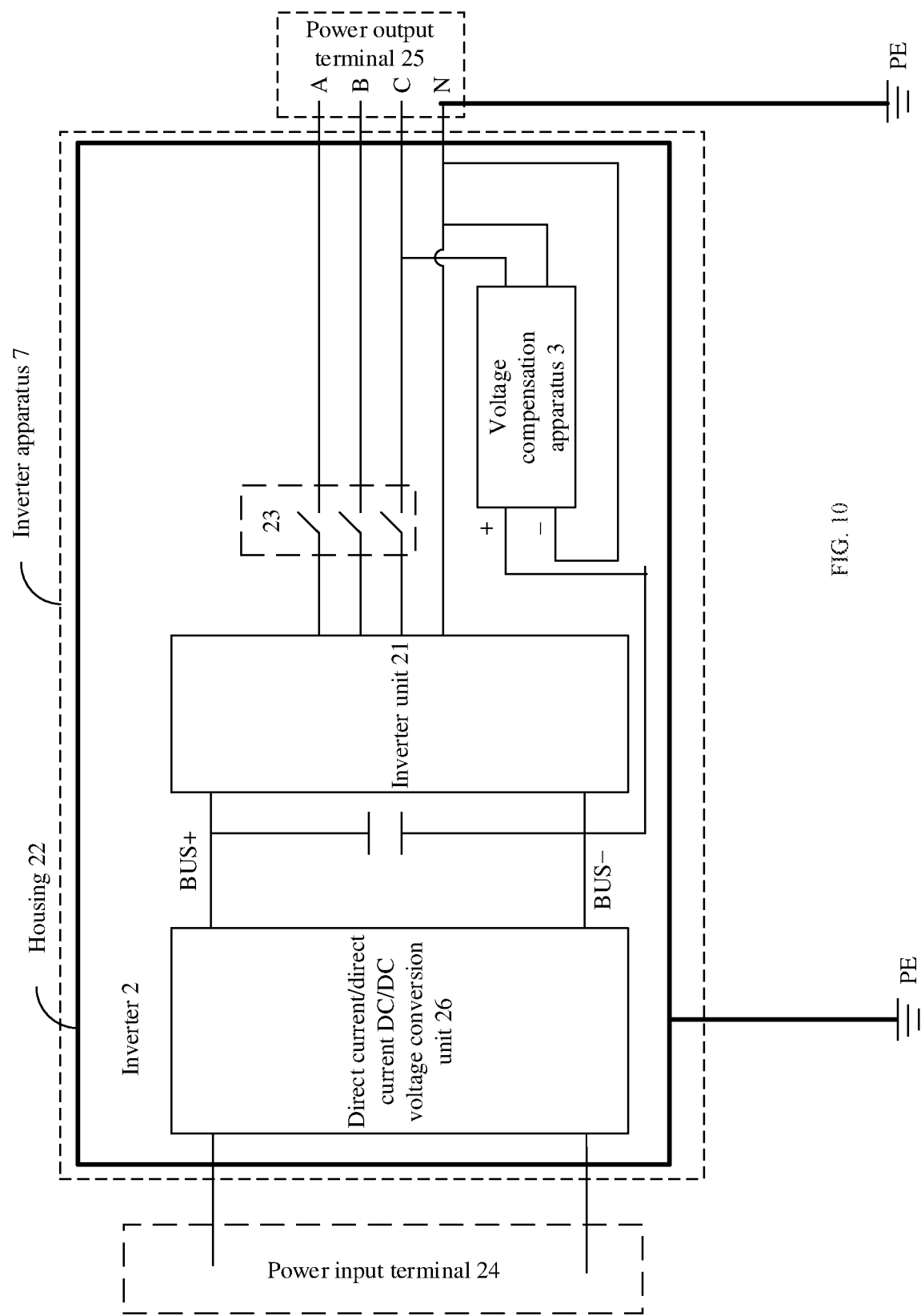
FIG. 10 is a schematic diagram of a structure of an inverter apparatus according to an embodiment.

Corresponding to this embodiment, FIG. 10 is a schematic diagram of a structure of an inverter according to an embodiment. In the inverter provided in FIG. 10, it is set that all connections of the voltage compensation apparatus are internal connections of the inverter. As shown in FIG. 10, the inverter 2 includes the inverter unit 21, the housing 22, a grid-connected switch unit 23, the power input terminal 24, the power output terminal 25, and the voltage compensation apparatus 3, and may further include a direct current/direct current DC/DC voltage conversion unit 26. The power input terminal 24 and the power output terminal 25 are disposed on the housing 22. The power input terminal 24 is configured to be coupled and connected to the power output terminal of the photovoltaic panel string 1. The power output terminal 25 is configured to be coupled and connected to the power grid 4. The power input terminal of the inverter unit 21 is coupled and connected to the power input terminal 24. When there is the direct current/direct current DC/DC voltage conversion unit 26, the power input terminal 24 is coupled and connected to a power input terminal of the direct current/direct current DC/DC voltage conversion unit 26, and a power output terminal of the direct current/direct current DC/DC voltage conversion unit 26 is coupled and connected to the power input terminal of the inverter unit 21. The direct current/direct current DC/DC voltage conversion unit 26 is configured to: receive a direct current transmitted by the photovoltaic panel string 1, convert the direct current into a voltage that meets a standard, and transmit the direct current obtained after conversion to the inverter unit 21. A power output terminal of the inverter unit 21 is coupled and connected to the power output terminal 25 by using the grid-connected switch unit 23.

The inverter 2 is coupled and connected to the power output terminal of the photovoltaic panel string 1 by using the power input terminal 24, to receive power input by the photovoltaic panel string 1. The inverter 2 is coupled and connected to the power grid 4 by using the power output terminal 25, to input a current obtained after conversion to the power grid 4. The inverter further includes the grid-connected switch unit 23, and the grid-connected switch unit 23 is disposed in a coupling loop between the power output terminal of the inverter unit 21 and the power output terminal 25, and is configured to control the inverter unit 21 to be connected to and disconnected from the power grid 4. In addition, to meet a normal working requirement of the inverter 2, the inverter 2 may further include components such as a capacitor and an inductor. The other components are not shown one by one in this embodiment.

In Embodiment 2, a power-obtaining connection manner of the voltage compensation apparatus 3 is as follows: As shown in FIG. 10, the power input terminal of the voltage compensation apparatus 3 is coupled and connected to a loop between the grid-connected switch unit 23 and the power output terminal 25. A difference from Embodiment 1 lies in that the power-obtaining connection manner of the voltage compensation apparatus 3 provided in Embodiment 2 is an internal connection of the inverter 2. Therefore, when mounting the inverter, the user may omit a connection operation between the voltage compensation apparatus 3 and the power grid 4, and only needs to select a corresponding inverter product based on an actual connection requirement.

One pole of the power output terminal of the voltage compensation apparatus 3 may be coupled and connected to a power output terminal coupled and connected to the N wire in the power grid 4, and/or coupled and connected to a coupling loop that is in the inverter 2 and that corresponds to the power output terminal coupled and connected to the N wire in the power grid 4. In FIG. 10, an example in which one pole of the power output terminal of the voltage compensation apparatus 3 is coupled and connected to the coupling loop that is in the inverter 2 and that corresponds to the power output terminal coupled and connected to the N wire in the power grid 4 is used.

Figure 11:
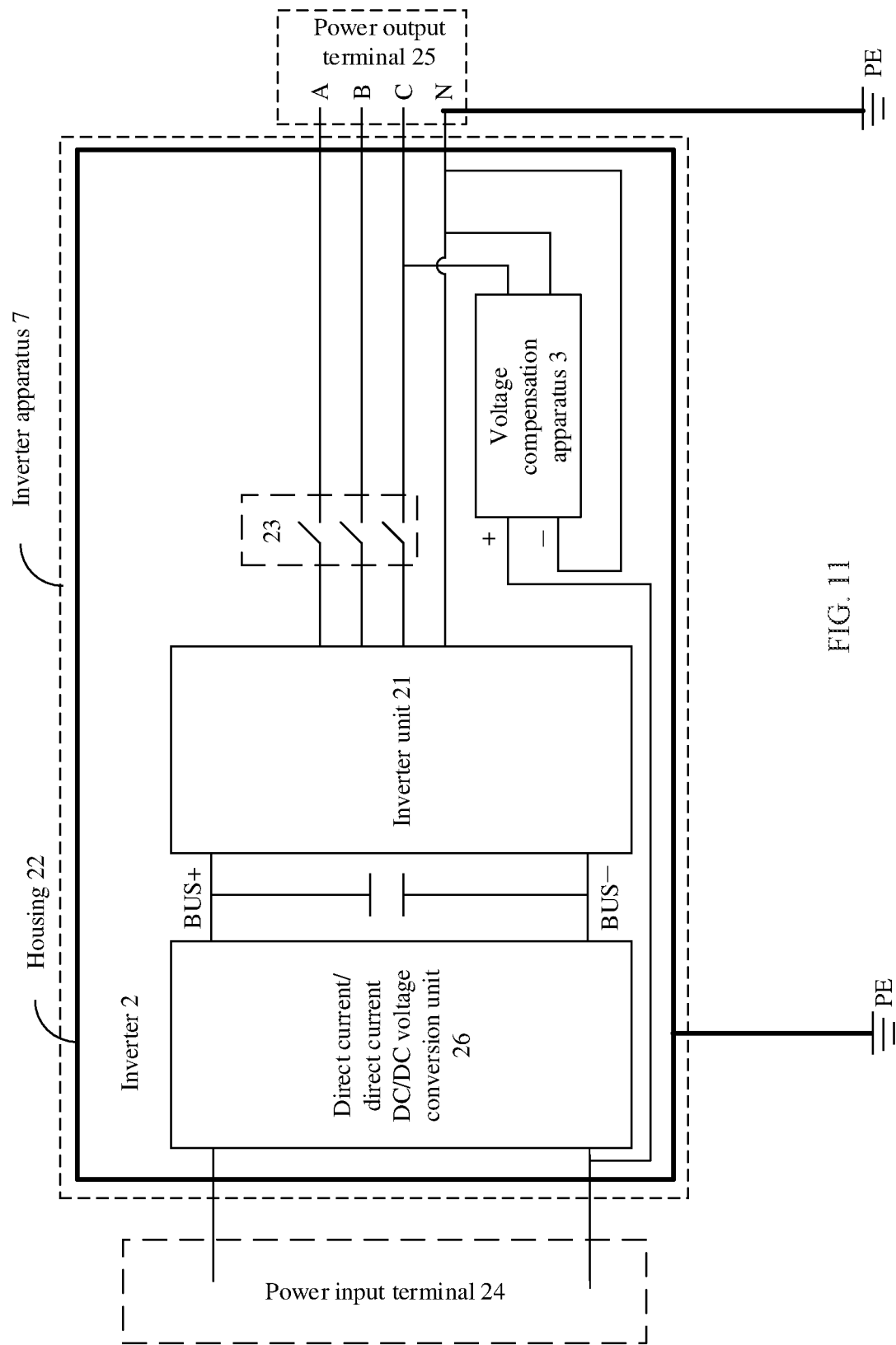
FIG. 11 is a schematic diagram of a structure of an inverter apparatus according to an embodiment.
Figure 12:
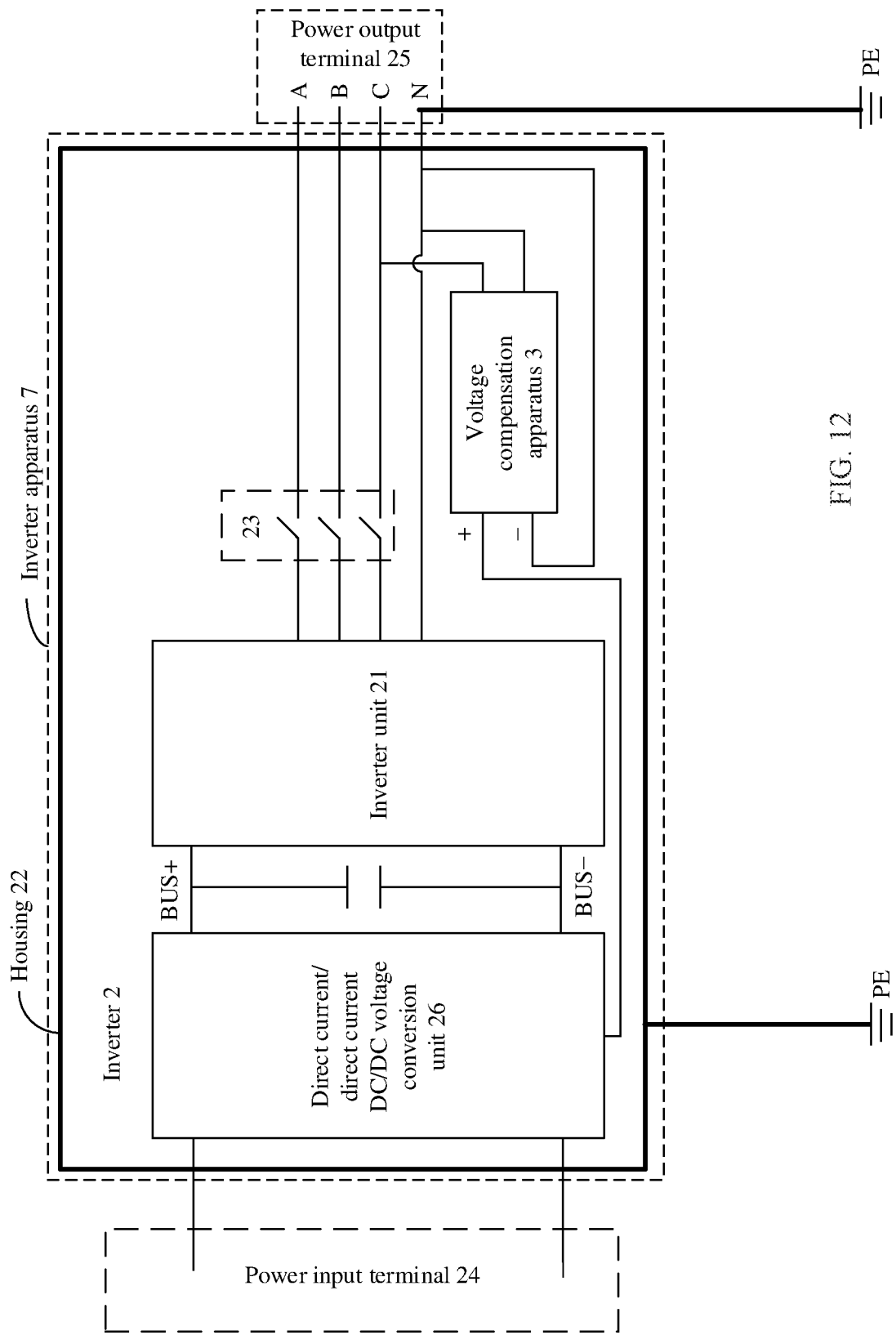
FIG. 12 is a schematic diagram of a structure of an inverter apparatus according to an embodiment.

The other pole of the power output terminal of the voltage compensation apparatus 3 may be coupled and connected to the power input terminal of the inverter 2, the power input terminal of the inverter unit 21 in the inverter 2, and/or the loop between the power input terminal of the inverter 2 and the power input terminal of the inverter unit 21. For example, FIG. 11 shows an example in which the other pole of the power output terminal of the voltage compensation apparatus 3 is coupled and connected to the power input terminal 24. FIG. 9 shows an example in which the other pole of the power output terminal of the voltage compensation apparatus 3 is coupled and connected to the power input terminal of the inverter unit 21 in the inverter 2, for example, is connected to the direct current bus. A coupling connection line between the direct current/direct current DC/DC voltage conversion unit 26 and the inverter unit 21 is referred to as the direct current bus (BUS), a coupling connection line between a positive pole of the power output terminal of the direct current/direct current DC/DC voltage conversion unit 26 and the inverter unit 21 is BUS+, and a coupling line between a negative pole of the power output terminal of the direct current/direct current DC/DC voltage conversion unit 26 and the inverter unit 21 is BUS−. FIG. 12 shows an example in which the other pole of the power output terminal of the voltage compensation apparatus 3 is coupled and connected to the loop between the power input terminal of the inverter 2 and the power input terminal of the inverter unit 21. An internal connection structure of the direct current/direct current DC/DC voltage conversion unit 26 is not shown in FIG. 12, and the direct current/direct current DC/DC voltage conversion unit 26 represents only the loop between the power input terminal of the inverter 2 and the power input terminal of the inverter unit 21. For a method for selecting a pole that is of the power output terminal of the voltage compensation apparatus 3 and that is to be connected to a pole of the foregoing coupling connection object, refer to the description in Embodiment 1. Details are not described herein.

Figure 13:
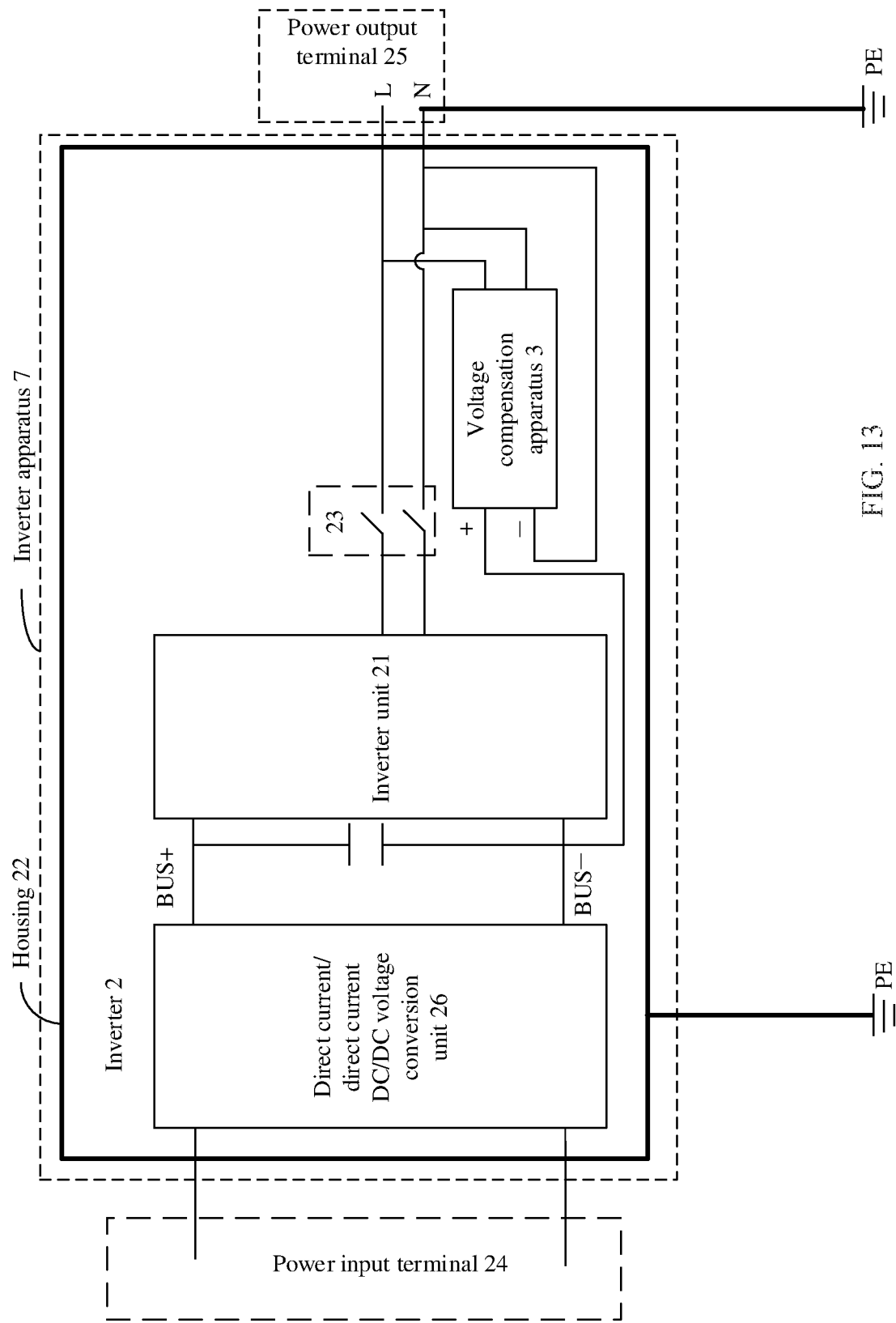
FIG. 13 is a schematic diagram of an internal structure of a single-phase inverter according to an embodiment.

In Embodiment 2, a three-phase inverter shown in FIG. 10 or a single-phase inverter shown in FIG. 13 may be selected for the inverter 2 based on a type of the power grid. For example, if the power grid is of a type that includes phases A, B, and C, a three-phase inverter is selected; or if the power grid is of a type that includes an L phase and an N wire, a single-phase inverter is selected.

In Embodiment 1 and Embodiment 2, the voltage compensation apparatus 3 includes a power conversion module. The power conversion module is coupled to the power input terminal of the voltage compensation apparatus 3 and the power output terminal of the voltage compensation apparatus 3, and is configured to convert the power obtained from the power grid 4 into a current type applicable to a side of the photovoltaic panel string 1. In an implementation, the power conversion module is an AC/DC conversion unit. In this way, an alternating current obtained from the power grid 4 may be converted into a direct current applicable to the side of the photovoltaic panel string 1. Further, the power conversion module is an isolated AC/DC conversion unit. In this way, the power grid 4 and the photovoltaic panel string 1 can be effectively isolated, to reduce interference and impact of the power grid 4 on the photovoltaic panel string 1, so as to improve use stability and security of the photovoltaic panel string 1, and effectively implement conversion of a current type.

The coupling connection in Embodiment 1 and Embodiment 2 may be any one of the following connection manners: a direct coupling connection, a coupling connection implemented by using a switching device, a coupling connection implemented by using a current limiting component, and a coupling connection implemented by using a switching device and a current limiting component. The direct coupling connection means that two devices are directly connected by using a connection line. The coupling connection implemented by using a switching device means that two devices are connected by using a connection line and are controlled to be connected to and disconnected from each other by using the switching device. The coupling connection implemented by using a current limiting component means that two devices are connected by using a connection line, and a current value flowing between the two devices is limited by using the current limiting component, to protect security of two circuits and devices. The coupling connection implemented by using a switching device and a current limiting component means that two devices are connected by using a connection line and are controlled to be connected to and disconnected from each other by using the switching device, and a current value flowing between the two devices is limited by using the current limiting component. The user may select an appropriate coupling connection manner based on an actual use requirement. This is not limited herein.

Optionally, the switching device may be one or a combination of a semiconductor switch, a relay, a contactor, a circuit breaker, and a mechanical switch. The current limiting component may be a resistor, an inductor, or a current limiting circuit.

Figure 14:
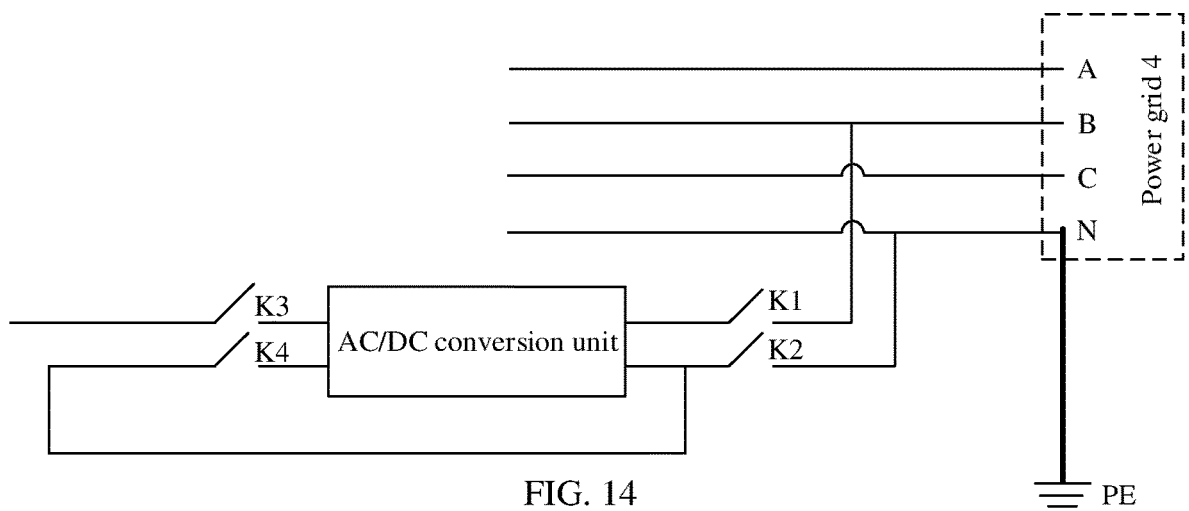
FIG. 14 is a schematic diagram of an internal structure of a power conversion module according to an embodiment.

In Embodiment 1 and Embodiment 2, the power conversion module may further include components that are used to assist the AC/DC conversion unit in implementing a power conversion function, for example, a switch and a resistor. The AC/DC conversion unit and these components may be connected in a plurality of connection manners, and finally coupled to the power input terminal and the power output terminal of the voltage compensation apparatus 3 (for ease of description, description of a coupling connection between the component in the power conversion module and the power i terminal is omitted in the following description, and is simplified as a correspondence between the component in the power conversion module and the power grid 4). Details are as follows:

In an implementation, FIG. 14 is a schematic diagram of an internal structure of a power conversion module according to an embodiment. As shown in FIG. 14, the power conversion module includes an AC/DC conversion unit, a first switch, a second switch, a third switch, and a fourth switch (the first switch to the fourth switch in FIG. 14 respectively correspond to K1-K4, where the description of the first switch, the second switch, the third switch, and the fourth switch is merely for ease of description, and constitutes no limitation on a function or the scope of the solution). The power grid 4 corresponding to FIG. 14 is a power grid that includes phases A, B, and C. A power input terminal of the AC/DC conversion unit is coupled, by using the first switch, to a power output terminal that is in power output terminals of the voltage compensation apparatus 3 and that is coupled and connected to the phase A, the phase B, or the phase C in the power grid, and a power input terminal of the AC/DC conversion unit is coupled, by using the second switch, to a power output terminal that is in the power output terminals of the voltage compensation apparatus 3 and that is coupled and connected to the N wire in the power grid 4. As shown in FIG. 14, the power input terminals of the AC/DC conversion unit are respectively coupled to the power output terminals that are of the voltage compensation apparatus 3 and that are coupled and connected to the phase B and the N wire in the power grid 4 (if the power grid is a power grid that includes an L phase and an N wire, a power input terminal of the AC/DC conversion unit is coupled and connected to the L phase in the power grid 4 by using the first switch, and is coupled and connected to the N wire in the power grid 4 by using the second switch), to obtain power from the power grid 4. As shown in FIG. 14, a coupling connection between the AC/DC conversion unit and another device is a coupling connection implemented by using a switching device. In this way, connection to and disconnection from different connection lines can be controlled by using K1-K4. It should be noted that there may be one or more first switches, and a quantity of first switches is related to a type of the power grid 4 coupled and connected to the power conversion module 31 and the power-obtaining connection manner. For example, if the power grid 4 is a power grid that includes an L phase and an N wire, there is one first switch, and the first switch is disposed on a connection line between the input terminal of the AC/DC conversion unit and the L phase in the power grid 4. In this case, the second switch is in a closed state. If the power grid 4 is a power grid that includes phases A, B, and C, and the used power-obtaining connection manner is to obtain power from the phase B and the phase C, there are two first switches, and the two switches are respectively disposed on connection lines between the power input terminal of the AC/DC conversion unit and the phase B and the phase C in the power grid 4. In this case, the second switch is in an open state. Alternatively, if the power-obtaining connection manner is to obtain power from the phase B and the N wire, as shown in FIG. 14, there is one first switch, the first switch is disposed on a connection line between the power input terminal of the AC/DC conversion unit and the phase B in the power grid 4, and the second switch is in a closed state. It is ensured that a corresponding first switch is disposed on each connection line that is used for power obtaining and that is between the power input terminal of the AC/DC conversion unit and the power output terminal of the voltage compensation apparatus 3. In this way, a connection line on which each first switch is located may be controlled to be connected and disconnected by using each first switch, to effectively control current flow and avoid a case in which damage is caused to the photovoltaic power generation system due to a problem such as an abnormal current.

Further, a connection line may be further established between the AC/DC conversion unit and a power output terminal of the voltage compensation apparatus 3 corresponding to each phase in the power grid 4, and the line is connected and disconnected by using a first switch disposed on each connection line, to control the phase from which power is obtained.

A pole of a power output terminal of the AC/DC conversion unit is coupled to the power input terminal of the voltage compensation apparatus 3 by using the third switch. In this way, the AC/DC conversion unit may be controlled, by controlling the third switch, to be connected to and disconnected from the power input terminal of the voltage compensation apparatus 3. Therefore, when the AC/DC conversion unit or the power grid 4 is abnormal, a coupling connection to the photovoltaic panel string 1 may be broken in a timely manner, to protect security of a component on the side of the photovoltaic panel string 1.

The other pole of the power output terminal of the AC/DC conversion unit is coupled and connected to the N wire in the power grid 4 by using the fourth switch, to implement grounding.

In a case, as shown in FIG. 14, a coupling connection point at which the power output terminal of the AC/DC conversion unit is connected to the N wire in the power grid 4 is on a connection line between the AC/DC conversion unit and the second switch. In this way, two lines of a voltage compensation loop formed for power obtaining and grounding can be simultaneously controlled to be connected and disconnected by using one switch, namely, the second switch. In this way, a circuit can be controlled more quickly and in a timely manner in a relatively urgent case such as a faulty line.

Figure 15:
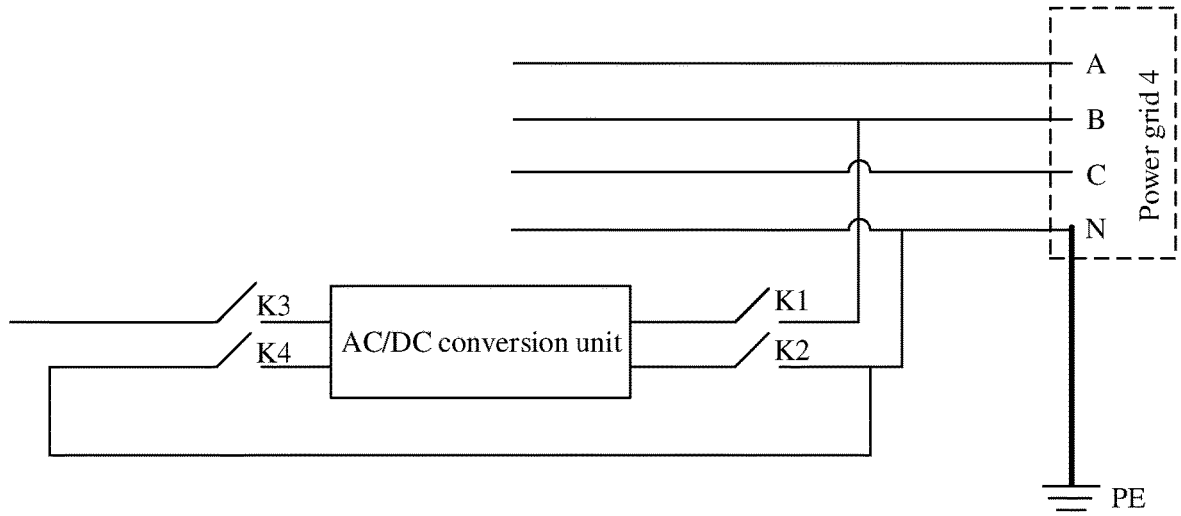
FIG. 15 is a schematic diagram of an internal structure of a power conversion module according to an embodiment.

In another case, FIG. 15 is a schematic diagram of an internal structure of a power conversion module according to an embodiment. A difference between FIG. 15 and FIG. 14 lies in that a coupling connection point at which the power output terminal of the AC/DC conversion unit is connected to the N wire in the power grid 4 is on a coupling connection line between the second switch and the N wire in the power grid 4. It may be understood that the second switch controls connection and disconnection only of a connection line that is used for power obtaining and that is between the AC/DC conversion unit and the power grid 4. In this case, decoupling can be effectively implemented for control of connection and disconnection of the two lines of the voltage compensation loop formed for power obtaining and grounding, so that the second switch performs control in a more targeted manner.

With reference to the foregoing selection of the switching device, one or a combination of a semiconductor switch, a relay, a contactor, a circuit breaker, and a mechanical switch may also be used for the first switch, the second switch, the third switch, and the fourth switch in this embodiment based on an actual requirement, for example, a mounting manner, a control manner, an amount of occupied space, costs, or security. For example, a relay may be used if automation of control is to be improved.

Figure 16:
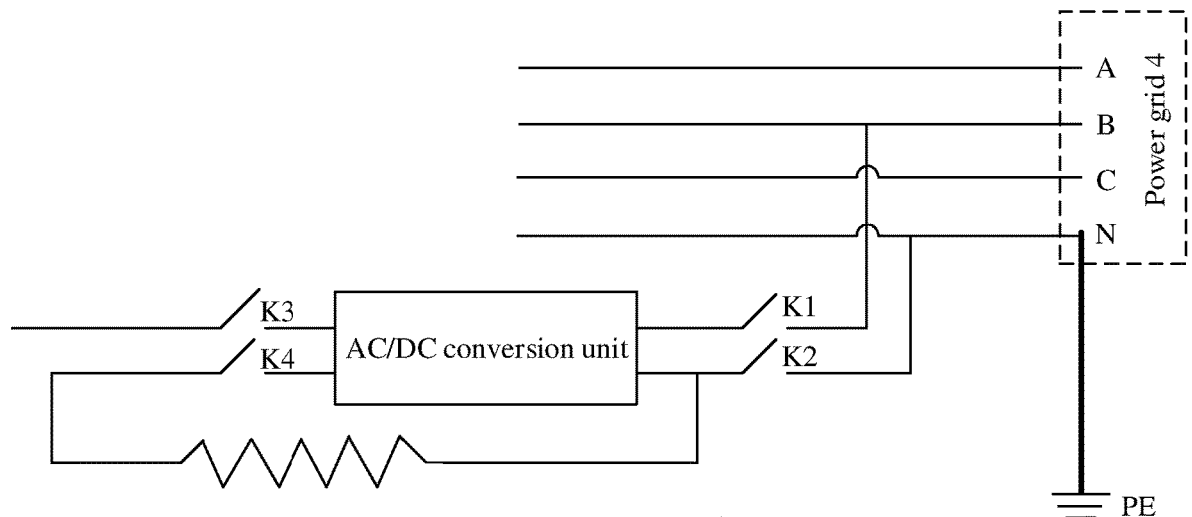
FIG. 16 is a schematic diagram of an internal structure of a power conversion module according to an embodiment.

In the power conversion modules shown in FIG. 14 and FIG. 15, if relatively high power is obtained from the power grid 4, relatively high power continuously flows in a loop formed by the AC/DC conversion unit and the fourth switch or in a loop formed by the AC/DC conversion unit, the fourth switch, and the second switch, to avoid a case in which damage is caused to a component in the loop for a plurality of times. FIG. 16 is a schematic diagram of an internal structure of a power conversion module. As shown in FIG. 16, to reduce damage to each component, a coupling connection manner implemented by using a current limiting component may be used, that is, a current limiting component is disposed between the AC/DC conversion unit and the N wire in the power grid 4, to reduce a current flowing through each component and protect each component. As shown in FIG. 16, the current limiting component may be disposed between the fourth switch and the N wire in the power grid. Further, the current limiting component may alternatively be disposed between the fourth switch and the AC/DC conversion unit. With reference to the foregoing selection of the current limiting component, any one of a resistor, an inductor, and a current limiting circuit may be selected as the current limiting component based on an actual requirement. In FIG. 16, a resistor is selected as the current limiting component.

Figure 17:
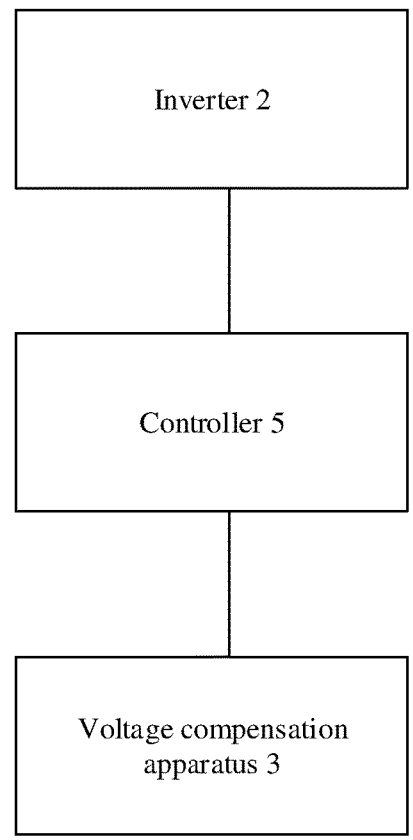
FIG. 17 is a schematic diagram of a structure of a photovoltaic power generation system that includes a controller according to an embodiment.

Based on Embodiment 1 and Embodiment 2, to improve working efficiency and quality of the photovoltaic power generation system, a controller may be newly added to the photovoltaic power generation system. FIG. 17 is a schematic diagram of a structure of a photovoltaic power generation system that includes a controller according to an embodiment. As shown in FIG. 17, a photovoltaic power generation system that includes the inverter 2 and the voltage compensation apparatus 3 that are two independent devices is used as an example, and the controller 5 is coupled to and communicates with the inverter 2 and the voltage compensation apparatus 3. If the photovoltaic panel string 1 generates power, it indicates that the photovoltaic panel string 1 is in a working state. In this case, the photovoltaic power generation system is in a power generation working state and cannot perform a voltage compensation operation. Therefore, the controller 5 controls the inverter 2 to be turned on, and turns off the voltage compensation apparatus 3. If the photovoltaic panel string 1 does not generate power, it indicates that the photovoltaic panel string 1 is not in a working state. In this case, a voltage compensation operation may be performed for the photovoltaic panel string 1. Therefore, the controller 5 controls the inverter 2 to be turned off, and turns on the voltage compensation apparatus 3. In this way, the photovoltaic power generation system can be automatically controlled by using the controller 5, to reduce manpower and improve the working efficiency and the quality of the photovoltaic power generation system.

Figure 18:
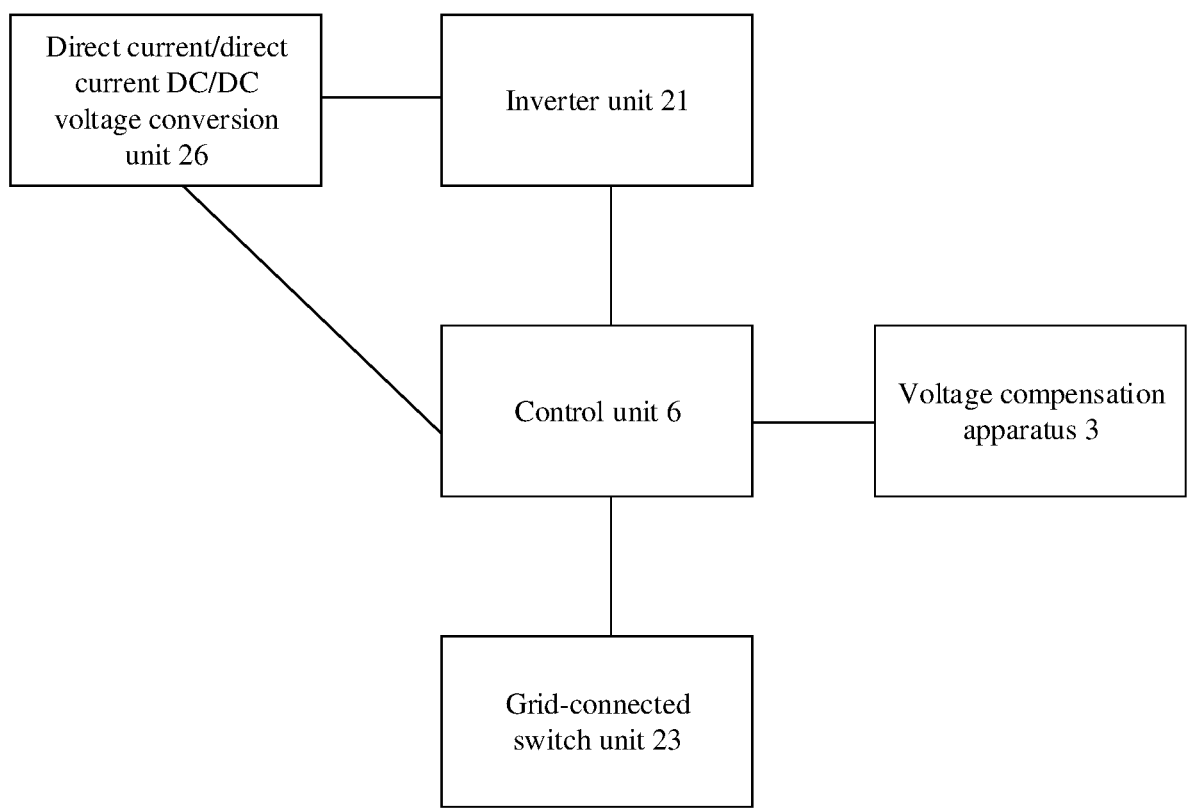
FIG. 18 is a schematic diagram of a structure of an inverter that includes a control unit according to an embodiment.

Based on Embodiment 2, to improve automatic control of a voltage compensation process by the inverter 2, as shown in FIG. 18, a control unit 6 is disposed in the inverter 2, and the control unit 6 is coupled to the inverter unit 21, the direct current/direct current DC/DC voltage conversion unit 26, the grid-connected switch unit 23, and the voltage compensation apparatus 3. In this way, the inverter unit 21, the direct current/direct current DC/DC voltage conversion unit 26, the grid-connected switch unit 23, and the voltage compensation apparatus 3 can be automatically controlled by using the control unit 6, to improve precision of controlling the inverter 2. Additionally, if the inverter 2 includes the control unit 6, the control unit 6 is also coupled to and communicates with the controller 5, and is controlled by the controller 5.

The objectives, solutions, and benefits are further described in detail in the foregoing embodiments. It should be understood that the foregoing descriptions are merely embodiments, but are not intended as limiting. Any modification, equivalent replacement, or improvement shall fall within the scope of the embodiments.

What is claimed is:

1. A voltage compensation apparatus, comprising: a power conversion module, wherein the power conversion module is coupled and connected to a power input terminal of the voltage compensation apparatus and a power output terminal of the voltage compensation apparatus;

the power input terminal of the voltage compensation apparatus is coupled and connected to a power grid, and is configured to obtain power from the power grid; and one pole of the power output terminal of the voltage compensation apparatus is coupled and connected to a power output terminal of a photovoltaic panel string, a power input terminal of an inverter, a power input terminal of an inverter unit in the inverter, and/or a loop between the power input terminal of the inverter and the power input terminal of the inverter unit, and an other pole of the power output terminal of the voltage compensation apparatus is coupled and connected to an N wire in the power grid, and is configured to apply the power obtained from the power grid between the power output terminal of the photovoltaic panel string and a ground;

wherein when a compensation voltage corresponding to the photovoltaic panel string is a forward voltage, a positive pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a negative pole of the power output terminal of the voltage compensation apparatus is coupled and connected to the N wire in the power grid; or when a compensation voltage corresponding to the photovoltaic panel string is a reverse voltage, a negative pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a positive pole of the power output terminal of the voltage compensation apparatus is coupled and connected to the N wire in the power grid.

2. The voltage compensation apparatus according to claim 1, wherein the voltage compensation apparatus is configured to be housed in the inverter and the power input terminal of the voltage compensation apparatus is coupled and connected between a grid-connected switch unit in the inverter and a power output terminal of the inverter.

3. The voltage compensation apparatus according to claim 1, wherein when the voltage compensation apparatus is disposed outside the inverter, the power input terminal of the voltage compensation apparatus is coupled and connected to a power output terminal of the inverter or is coupled and connected to the power grid located outside the inverter.

4. The voltage compensation apparatus according to claim 1, wherein power input terminals of the voltage compensation apparatus are respectively coupled and connected to at least one of phases A, B, and C in the power grid and the N wire in the power grid; or
power input terminals of the voltage compensation apparatus are connected to at least two of phases A, B, and C in the power grid; or
power input terminals of the voltage compensation apparatus are coupled and connected to an L phase in the power grid and the N wire in the power grid.

5. The voltage compensation apparatus according to claim 1, wherein the power conversion module is an isolated AC/DC conversion unit.

6. The voltage compensation apparatus according to claim 1, wherein a coupling connection is at least one of the following connection manners: a direct coupling connection, a coupling connection implemented by using a switching device, a coupling connection implemented by using a current limiting component, and a coupling connection implemented by using a switching device and a current limiting component.

7. The voltage compensation apparatus according to claim 6, wherein the switching device is one or a combination of a semiconductor switch, a relay, a contactor, a circuit breaker, and a mechanical switch.

8. The voltage compensation apparatus according to claim 6, wherein the current limiting component is a resistor, an inductor, or a current limiting circuit.

9. An inverter apparatus, wherein the inverter apparatus comprises an inverter and a voltage compensation apparatus;
the inverter comprises a housing, a first power input terminal, a first power output terminal, an inverter unit, and a grid-connected switch unit;
the first power input terminal and the first power output terminal are disposed on the housing, the first power input terminal is configured to be coupled and connected to a power output terminal of a photovoltaic panel string, and the first power output terminal is configured to be coupled and connected to a power grid;
a power input terminal of the inverter unit is coupled and connected to the first power input terminal;
a power output terminal of the inverter unit is coupled and connected to the first power output terminal by using the grid-connected switch unit;
a power input terminal of the voltage compensation apparatus is coupled and connected between the grid-connected switch unit and the first power output terminal; and
one pole of a power output terminal of the voltage compensation apparatus is coupled and connected to the power output terminal of the inverter unit and coupled and connected to an N wire in the power grid, and/or is coupled and connected to a coupling loop that is in the inverter and that corresponds to the first power output terminal of the inverter and coupled and connected to the N wire in the power grid, and an other pole of the power output terminal of the voltage compensation apparatus is coupled and connected to the first power input terminal of the inverter, the power input terminal of the inverter unit in the inverter, and/or a loop between the first power input terminal of the inverter and the power input terminal of the inverter unit;
wherein when a compensation voltage corresponding to the photovoltaic panel string is a forward voltage, a positive pole of the power output terminal of the voltage compensation apparatus is coupled and connected to the power output terminal of the photovoltaic panel string, the first power input terminal of the inverter, the power input terminal of the inverter unit in the inverter, and/or the loop between the first power input terminal of the inverter and the power input terminal of the inverter unit, and a negative pole of the power output terminal of the voltage compensation apparatus is coupled and connected to the N wire in the power grid; or
when a compensation voltage corresponding to the photovoltaic panel string is a reverse voltage, a negative pole of the power output terminal of the voltage compensation apparatus is coupled and connected to the power output terminal of the photovoltaic panel string, the first power input terminal of the inverter, the power input terminal of the inverter unit in the inverter, and/or the loop between the first power input terminal of the inverter and the power input terminal of the inverter unit, and a positive pole of the power output terminal of the voltage compensation apparatus is coupled and connected to the N wire in the power grid.

10. The inverter apparatus according to claim 9, wherein the inverter further comprises: a direct current/direct current (DC/DC) conversion unit;
an input terminal of the DC/DC conversion unit is coupled and connected to the first power input terminal; and
an output terminal of the DC/DC conversion unit is coupled and connected to the power input terminal of the inverter unit.

11. The inverter apparatus according to claim 10, wherein the inverter further comprises:
a control unit; and
the control unit is coupled and connected to the inverter unit, the DC/DC conversion unit, the grid-connected switch unit, and the voltage compensation apparatus.

12. A photovoltaic power generation system, wherein the photovoltaic power generation system comprises a photovoltaic panel string and an inverter apparatus, and the inverter apparatus comprises an inverter and a voltage compensation apparatus;
the voltage compensation apparatus further comprising:
a power conversion module, wherein the power conversion module is coupled and connected to a power input terminal of the voltage compensation apparatus and a power output terminal of the voltage compensation apparatus;
the power input terminal of the voltage compensation apparatus is coupled and connected to a power grid, and is configured to obtain power from the power grid; and
one pole of the power output terminal of the voltage compensation apparatus is coupled and connected to a power output terminal of the photovoltaic panel string, a power input terminal of the inverter, a power input terminal of an inverter unit in the inverter, and/or a loop between the power input terminal of the inverter and the power input terminal of the inverter unit, and an other pole of the power output terminal of the voltage compensation apparatus is coupled and connected to an N wire in the power grid, and is configured to apply the power obtained from the power grid between the power output terminal of the photovoltaic panel string and a ground;

wherein when a compensation voltage corresponding to the photovoltaic panel string is a forward voltage, a positive pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a negative pole of the power output terminal of the voltage compensation apparatus is coupled and connected to the N wire in the power grid; or when a compensation voltage corresponding to the photovoltaic panel string is a reverse voltage, a negative pole of the power output terminal of the voltage compensation apparatus is coupled and connected to the power output terminal of the photovoltaic panel string, the power input terminal of the inverter, the power input terminal of the inverter unit in the inverter, and/or the loop between the power input terminal of the inverter and the power input terminal of the inverter unit, and a positive pole of the power output terminal of the voltage compensation apparatus is coupled and connected to the N wire in the power grid.

13. The photovoltaic power generation system according to claim 12, further comprising:

a controller; and the controller is coupled to and communicates with the inverter and the voltage compensation apparatus.

* * * * *